US012119929B2

(12) United States Patent
Shilo et al.

(10) Patent No.: US 12,119,929 B2
(45) Date of Patent: Oct. 15, 2024

(54) TECHNIQUES FOR PRE AND POST FORWARD ERROR CORRECTION AND PACKET PADDING IN RADIO TRANSMISSION

(71) Applicant: HUAWEI TECHNOLOGIES CO., LTD., Shenzhen (CN)

(72) Inventors: Shimon Shilo, Hod Hasharon (IL); Oded Redlich, Hod Hasharon (IL); Jian Yu, Shenzhen (CN); Genadiy Tsodik, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/189,878

(22) Filed: Mar. 24, 2023

(65) Prior Publication Data

US 2023/0261784 A1    Aug. 17, 2023

Related U.S. Application Data

(63) Continuation of application No. PCT/CN2020/118420, filed on Sep. 28, 2020.

(51) Int. Cl.
*H04L 1/00* (2006.01)
*H04L 5/00* (2006.01)
*H04L 25/02* (2006.01)

(52) U.S. Cl.
CPC .......... *H04L 1/0041* (2013.01); *H04L 1/0045* (2013.01); *H04L 5/0023* (2013.01); *H04L 25/0224* (2013.01)

(58) Field of Classification Search
None
See application file for complete search history.

(56) References Cited

U.S. PATENT DOCUMENTS 11,722,354 B2 *  8/2023  Cao .................. H04L 27/3461
                                                         370/328
2016/0374017 A1 * 12/2016  Stacey .............. H04W 52/0216
(Continued)

FOREIGN PATENT DOCUMENTS

CN         107251469 A         10/2017
CN      202310658900.4         1/2024
(Continued)

OTHER PUBLICATIONS

Cao et al., EHT Pre-FEC Padding and Packet Extension, IEEE 802.11-20/1331r0, Total 18 pages (Aug. 26, 2020).
(Continued)

*Primary Examiner* — Guerrier Merant
(74) *Attorney, Agent, or Firm* — Leydig, Voit & Mayer, Ltd.

(57) ABSTRACT

The present disclosure relates to techniques for forward error correction and packet padding in radio transmission, e.g. WiFi communication schemes such as IEEE 802.11ax and 802.11be. In particular, the disclosure relates to a communication device configured to: transmit and/or receive a data frame based on a set of pre&post-Forward Error Correction (pre&post-FEC) parameters and a set of packet extension (PE) parameters, wherein the set of pre&post-FEC parameters is based on an extension of a set of pre&post-FEC parameters defined for a second radio transmission technology with respect to a size of resource units (RUS) supported by a first radio transmission technology, wherein the set of pre&post-FEC parameters is based on a combination of RUs that is supported by the first radio transmission technology, and wherein the set of PE parameters is based on an extension of a set of PE parameters defined for the second radio transmission technology.

14 Claims, 10 Drawing Sheets

(56) References Cited

U.S. PATENT DOCUMENTS

| | | | |
|---|---|---|---|
| 2019/0238259 | A1 | 8/2019 | Huang et al. |
| 2019/0327740 | A1 | 10/2019 | Verma et al. |
| 2020/0052832 | A1 | 2/2020 | Tian et al. |
| 2020/0083983 | A1 | 3/2020 | Chen et al. |
| 2020/0145139 | A1 | 5/2020 | Merlin et al. |
| 2020/0177425 | A1 | 6/2020 | Chen et al. |
| 2020/0329519 | A1* | 10/2020 | Cao ................. H04L 5/0046 |
| 2020/0383133 | A1* | 12/2020 | Hu .................. H04L 1/0041 |

FOREIGN PATENT DOCUMENTS

| | | | | |
|---|---|---|---|---|
| EP | 3748883 | A1 * | 12/2020 | ........ H03M 13/1102 |
| JP | 2023-519201 | | 2/2024 | |
| WO | WO-2017122240 | A1 * | 7/2017 | ............... H04L 1/00 |
| WO | WO-2017195455 | A1 * | 11/2017 | ........... H04B 7/0413 |
| WO | WO-2020241183 | A1 * | 12/2020 | .......... H04W 72/121 |

OTHER PUBLICATIONS

Zhang et al., "HE PHY Padding and Packet Extension," IEEE 802.11-15/0810, Total 38 pages, Institute of Electrical Electronics Engineers, New York, New York (Jul. 10, 2015).

"IEEE P802.11ax/D7.0, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," Working Group of the LAN/MAN Standards Committee of the IEEE Computer Society, Total 822 pages, Institute of Electrical Electronics Engineers, New York, New York (Sep. 2020).

"IEEE P802.11ax/D6.0, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," Total 780 pages, Institute of Electrical Electronics Engineers, New York, New York (Nov. 2019).

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11-2016, Total 3534 pages, Institute of Electrical Electronics Engineers, New York, New York (Dec. 7, 2016).

"High Efficiency (HE) PHY Specification," IEE Draft, TGAX_CL-6, IEEE-SA, Piscataway, NJ USA, 802.11ax/ D0.5, XP068137445, pp. 1-207, URL: www.ieee802.org/11/private/Draft_Standards/11ax/ TGax_Cl_26.rtf, Institute of Electrical and Electronics Engineers, New York, New York, Retrieved on Oct. 1, 2016 (Sep. 2016).

Deng et al., "IEEE 802.11 be Wi-Fi 7: New Challenges and Opportunities," IEEE Communications Surveys and Tutorials, vol. 22, No. 4, XP055911229, DOI: 10.1109/COMST.2020.3012715, Retrieved from the Internet: URL: https://arxiv.org/pdf/2007.13401. pdf, Total 30 pages, Institute of Electrical and Electronics Engineers, New York, New York (Aug. 3, 2020).

Zhang et al., "Proposed Draft Text: Coding," IEEE 802.11-20/ 1339r5, Wireless LANs, NXP, Total 9 pages, Institute of Electrical and Electronics Engineers, New York, New York (Aug. 24, 2020).

Pulikkoonattu et al., "Proposed Draft Text for EHT Modulation and Coding Schemes (EHT-MCS)," Broadcom, IEEE P802.11, Wireless LANs, Total 4 pages, Institute of Electrical and Electronics Engineers, New York, New York (Aug. 27, 2020).

Au, "Compendium of straw polls and potential changes to the Specification Framework Document," IEEE 802.11-20/0566r69, Internet URL: https://mentor.ieee.org/802.11/dcn/20/11-20-0566-69-00be-compendium-of-straw-polls-and-potential-changes-to-the-specification-framework-document.docx>, Total 28 pages, Institute of Electrical and Electronics Engineers, New York, New York (Sep. 23, 2020).

Kim, "CR on HE Capabilities," IEEE 802.11-19/0837r0, IEEE, Internet URL: https://mentor.ieee.org/802.11/dcn/19/11-19-0837-00-00ax-cr-on-he-capabilities.docx>, Total 13 pages, Institute of Electrical and Electronics Engineers, New York, New York (May 12, 2019).

Hu et al., "EHT PPE Thresholds Field," IEEE 802.11-20/1847r0, Huawei, Internet URL: https://mentor.ieee.org/802.11/dcn/20/11-20-1847-00-00be-eht-ppe-thresholds-field.pptx>, Total 14 pages, Institute of Electrical and Electronics Engineers, New York, New York (Nov. 10, 2020).

Pulikkoonattu et., "Proposed Draft Text for EHT Modulation and Coding Schemes (EHT-MCS)," IEEE 802.11.11-20/1338r5, Total 60 pages (Aug. 27, 2020).

"High Efficiency (HE) Phy Specification," IEE Draft, TGAX_CL_ 6, IEEE-SA, Piscataway, NJ USA, 802.11ax/ XP068137445, pp. 1-207, URL: www.ieee802.org/11/private/Draft_Standards/11ax/ TGax_CI_26.rtf, Institute of Electrical and Electronics Engineers, New York, New York, Retrieved on Oct. 1, 2016 (Sep. 2016).

Deng et al., "IEEE 802.11 be Wi-Fi 7: New Challenges and Opportunities," IEEE Communications Surveys and Tutorials, vol. 22, No. 4, XP055911229, DOI: 10.1109/COMST.2020.3012715, Retrieved from the Internet: URL: https://arxiv.org/pdf/2007.13401. pdf, Total 30 pages, Institute of Electronical and Eletronics Engineers, New York, New York (Aug. 3, 2020).

\* cited by examiner

400

| Result of comparison of the constellation index $x$ of an HE PPDU with NSTS value $n$ and RU allocation size that corresponds to the RU Allocation index = $(b + DCM)$ to the value in the PPET8 NSTS$n$ RU$(b + DCM)$ subfield | Result of comparison of the constellation index $x$ of an HE PPDU with NSTS value $n$ and RU allocation size that corresponds to the RU Allocation index = value $(b + DCM)$ to the value in the PPET16 NSTS$n$ RU$(b + DCM)$ subfield | Nominal packet padding for an HE PPDU transmitted to this STA using the constellation index = $x$, NSTS = $n$ and RU allocation size that corresponds to the RU Allocation index = $(b + DCM)$ |
|---|---|---|
| $x$ greater than or equal to PPET8 | $x$ less than PPET16 or PPET16 equal to None | 8 µs |
| $x$ greater than PPET8 or PPET8 equal to None | $x$ greater than or equal to PPET16 | 16 µs |
| All other combinations not otherwise listed in this table | | 0 |
| NOTE—DCM = 1 if the HE PPDU uses DCM; DCM = 0 otherwise. | | |

Figure 4

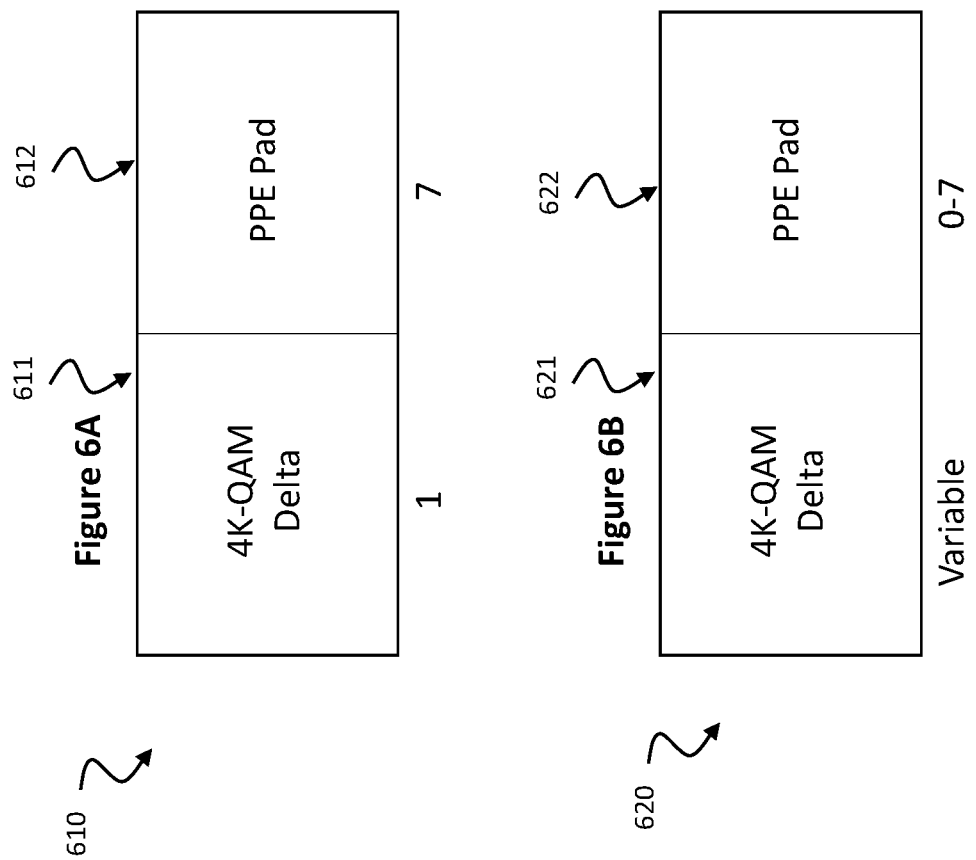

TECHNIQUES FOR PRE AND POST FORWARD ERROR CORRECTION AND PACKET PADDING IN RADIO TRANSMISSION

CROSS-REFERENCE TO RELATED APPLICATIONS

This application is a continuation of International Application No. PCT/CN2020/118420, filed on Sep. 28, 2020, the disclosure of which is hereby incorporated by reference in its entirety.

TECHNICAL FIELD

The present disclosure relates to techniques for pre Forward Error Correction (FEC), post Forward Error Correction and packet padding in radio transmission. The disclosure particularly relates to WiFi radio transmission and packet extension (PE) and pre/post-FEC padding in WiFi radio transmission.

BACKGROUND

In radio transmission using OFDM (Orthogonal Frequency Division Multiplex), some padding at the end of the packet that does not contain any information is inserted to relax processing requirements. This padding artificially increases the packet, allowing the receiver to complete the decoding processing. In radio communication according to WiFi standard, for example according to IEEE 802.11ax, packet extension (PE) and pre&post FEC were introduced to relax the processing requirements. These two mechanisms were introduced based on specific requirements for number of spatial streams, resource unit (RU) size and QAM (Quadrature Amplitude Modulation) size. When a new version of the radio communication standard, e.g. a new version of WiFi according to IEEE 802.11be, is introduced, these original requirements for number of spatial streams, RU size and QAM size require an update by introducing additional values.

As the new standard, in particular IEEE 802.11be is going to support higher values for number of spatial streams, RU size and QAM size, the definitions, signalling and usage of PE & pre&post-FEC padding needs to be revised.

SUMMARY

It is the object of this disclosure to provide techniques for improving performance of radio transmission in advanced communication schemes such as EHT (Extreme High Throughput) WiFi, for example according to IEEE 802.11be.

In particular, it is an object of this disclosure to update the definitions, signalling and usage of PE & pre&post-FEC padding in new radio transmission standards such as EHT WiFi, for example according to IEEE 802.11be.

This object is achieved by the features of the independent claims. Further implementation forms are apparent from the dependent claims, the description and the figures.

A basic idea of this disclosure is to apply a new definition of packet extension and pre&post Forward Error Correction (FEC) padding that is compliant to the new radio transmission standard, for example EHT WiFi, e.g. according to IEEE 802.11be.

An appropriate pre&post-FEC and packet extension mechanism is designed particularly for IEEE 802.11be. This mechanism is based on the mechanism that was defined in the current standard IEEE 802.11ax (IEEE 802.11-15/0810, September 2015: HE PHY Padding and Packet Extension) which is not suitable to the new features that are added to the new standard.

IEEE 802.11 be introduces three aspects which require adaptation of the pre&post-FEC parameters: bandwidth of 240 MHz (achieved by puncturing 80 MHz within a BW of 320 MHz) and/or 320 MHz: multi-RUs: and 4K-QAM. In order to evaluate these aspects, the disclosure illustrates potential values for $N_{SD\_Short}$ and their impact on $N_{CBPS\_Short}$, $N_{DBPS\_Short}$ and $N_{DBPS\_Short}/N_{ES}$, considering the requirement for maintaining integer values. It can be shown by validating link-level simulation, that there is no real impact by slightly modifying the value of $N_{SD\_Short}$. In the disclosure, values are chosen that work with/without DCM, considering that BCC is limited to ≤242-tone RUs (and therefore requires an integer $N_{DBPS\_Short}/N_{ES}$).

In order to describe the disclosure in detail, the following terms, abbreviations and notations will be used:

FEC Forward Error Correction
Post-FEC Post Forward Error Correction
Pre-FEC Pre Forward Error Correction
PE Packet Extension
OFDM Orthogonal Frequency Division Multiplex
OFDMA Orthogonal Frequency Division Multiple Access
QAM Quadrature Amplitude Modulation
BW bandwidth
$N_{SD\_Short}$ number of subcarrier per symbol
$N_{CBPS\_Short}$ number of coded bits per symbol
$N_{DBPS\_Short}$ number of data bits per symbol
RU resource unit
STA Station according to WiFi notation
AP Access point according to WiFi notation
EHT Extreme High Throughput
SIFS Short Interframe Space
PPDU Physical Protocol Data Unit Resource Unit (RU) is a unit in OFDMA terminology used in WiFi schemes to denote a group of subcarriers (tones) used in both Downlink (DL) and Uplink (UL) transmissions. With OFDMA, different transmit powers may be applied to different RUs. There are maximum of 9 RUs for 20 MHz bandwidth, 18 in case of 40 MHz and more in case of 80 or 160 MHz bandwidth. The RUs enable an Access Point to allow multi-users to access it simultaneously and efficiently.

Short Interframe Space (SIFS), is the amount of time in microseconds required for a wireless interface to process a received frame and to respond with a response frame. It is the difference in time between the first symbol of the response frame in the air and the last symbol of the received frame in the air.

In this disclosure pre and post Forward Error Correction (FEC) parameters are described, also abbreviated as pre&post-FEC parameters or pre/post FEC parameters. Pre-FEC parameters are related to pre-FEC padding and corresponding pre-FEC padding bits. Post-FEC parameters are related to post-FEC padding and corresponding post-FEC padding bits. Pre-FEC padding is performed before Forward Error Correction (FEC) while post FEC padding is performed after Forward Error Correction (FEC), e.g. according to the illustration shown in FIG. 1. While this disclosure defines the terms pre&post-FEC and pre/post-FEC parameters, these terms should be understood in the meaning of pre and/or post FEC parameters, i.e., including the three cases that 1) both pre-FEC padding and post-FEC padding is applied: 2) only post-FEC padding is applied: and 3) only pre-FEC padding is applied.

According to a first aspect, the disclosure relates to a communication device, configured to: transmit and/or receive a data frame based on a set of pre&post-Forward Error Correction, FEC, parameters and a set of packet extension, PE, parameters, wherein the set of pre&post-FEC parameters is based on an extension of a set of pre&post-FEC parameters defined for a second radio transmission technology with respect to a size of resource units, RUs, supported by a first radio transmission technology, wherein the set of pre&post-FEC parameters is based on a combination of RUs that is supported by the first radio transmission technology and wherein the set of PE parameters is based on an extension of a set of PE parameters defined for the second radio transmission technology with respect to a constellation size, a number of total space time streams and a resource unit, RU, allocation size supported by the first radio transmission technology.

By transmitting/receiving a data frame based on such a new definition of pre&post-FEC parameters and PE parameters, the communication device improves performance of radio transmission in advanced communication schemes such as EHT WiFi, e.g. according to IEEE 802.11be. This new definition of packet extension and pre&post Forward Error Correction padding is compliant to the new radio transmission standard, for example EHT WiFi, e.g. according to IEEE 802.11be.

The first and second radio transmission technologies can be WiFi technologies, the second radio transmission technology can be an existing WiFi technology, while the first radio technology can be a new WiFi technology, e.g. a new WiFi technology having higher bandwidth, multi-resource units and/or higher constellation scheme. For example, the first radio transmission technology can be 802.11be WiFi and the second radio transmission technology can be 802.11ax WiFi.

The first and second radio transmission technologies can be the same (with different settings) or different (with different capabilities).

A multiple RU as defined by the new first radio transmission technology is formed from a combination of two or more RUs defined by the old second radio transmission technology.

In an exemplary implementation of the communication device, the communication device is configured to: determine where a post-padding begins in the data frame based on the set of pre&post-FEC parameters, wherein the set of pre&post-FEC parameters is based on: an integer number of data subcarriers for a last symbol of the data frame, $N_{SD\_Short}$, as defined by an extended $N_{SD\_Short}$ table, wherein the extended $N_{SD\_Short}$ table is an extension of a $N_{SD\_Short}$ table defined by the second radio transmission technology with respect to additional values of $N_{SD\_Short}$ defined by the first radio transmission technology, an integer number of coded bits per symbol for the last symbol of the data frame, $N_{CBPS\_Short}$, wherein $N_{CBPS\_Short}$ depends on $N_{SD\_Short}$, and an integer number of data bits per symbol for the last symbol of the data frame, $N_{DBPS\_Short}$, wherein $N_{DBPS\_Short}$ depends on $N_{CBPS\_Short}$.

This provides the advantage that the set of pre&post-FEC parameters indicates where the post-padding begins in the data frame and hence post-padding can be efficiently performed by using that information.

Four pre-FEC padding boundaries partition the last OFDM symbol (or 2 last symbols if space-time-coding is used) of an HE PPDU and EHT PPDU into four symbol segments. The pre-FEC padding may pad toward one of the four possible boundaries. The post-FEC padding bits are then used to pad the remaining symbol segments. In other words, the pre-FEC padding bits ensure that the FEC output bits in the last OFDM symbols end up with one of the 4 segments' boundaries as exemplarily illustrated in FIG. 2.

The pre&post-FEC parameters are also called "pre&post-FEC padding parameters" since these are the parameters that set the amount of padding bits in the last symbol of a data frame (or the last 2 symbols of a data frame when space-time-coding is applied). With pre&post-FEC padding, portions of ¼ of the last OFDM symbol (i.e. ¼, ½, ¾) are padded after encoding: these portions need not be decoded.

In an exemplary implementation of the communication device, the set of pre&post-FEC parameters is based on an extension of an $N_{SD\_Short}$ table defined for the second radio transmission technology with respect to combinations of RU values supported by the first radio transmission technology, wherein the $N_{SD\_Short}$ table comprises predefined numbers of $N_{SD\_Short}$ values.

This provides the advantage that the extended $N_{SD\_Short}$ table can be easily derived from the existing $N_{SD\_Short}$ table and efficiently used to perform pre&post-padding for the first radio transmission technology.

In an exemplary implementation of the communication device, the extended $N_{SD\_Short}$ table defines the numbers of $N_{SD\_Short}$ values for a dual-carrier modulation, DCM, switched on and/or a DCM switched off.

This provides the advantage that dual-carrier modulation can be supported by the new scheme.

In an exemplary implementation of the communication device, the extended $N_{SD\_Short}$ table includes one or more of the following combinations of RU values: 52+26, 106+26, 484+242, 996+484, 242+484+996, 484+2×996, 3×996, 484+3×996, 4×996.

This provides the advantage that multiple combinations of resource unit values can be supported by the new scheme.

In an exemplary implementation of the communication device, for an RU size of 52+26 a value of $N_{SD\_Short}$ is 18 for DCM=0, and is 8 for DCM=1, for an RU size of 106+26 a value of $N_{SD\_Short}$ is 30 for DCM=0, and is 14 for DCM=1, for an RU size of 484+242 a value of $N_{SD\_Short}$ is 180 or 174 for DCM=0, and is 90 for DCM=1, for an RU size of 996+484 a value of $N_{SD\_Short}$ is 360 for DCM=0, and is 180 for DCM=1, for an RU size of 242+484+996 a value of $N_{SD\_Short}$ is 420 for DCM=0, and is 210 for DCM=1, for an RU size of 484+2×996 a value of $N_{SD\_Short}$ is 600 or 606 or 612 for DCM=0, and is 300 or 306 for DCM=1, for an RU size of 3×996 a value of $N_{SD\_Short}$ is 720 or 726 or 738 for DCM=0, and is 360 or 366 for DCM=1, for an RU size of 484+3×996 a value of $N_{SD\_Short}$ is 840 or 846 or 852 for DCM=0, and is 420 or 426 for DCM=1, for an RU size of 4×996 a value of $N_{SD\_Short}$ is 978 or 984 or 990 for DCM=0, and is 486 or 492 for DCM=1. This implementation corresponds to Table 2 shown below.

Possible combinations of RUs are given in the following Example: $N_{SD\_Short}$ for 484+242 is exactly $N_{SD\_Short}$ (242)+ $N_{SD\_Short}$ (484): $N_{SD\_Short}$ for 52+26 is exactly $N_{SD\_Short}$ (52)+$N_{SD\_Short}$ (26): $N_{SD\_Short}$ for 106+26 is exactly $N_{SD\_Short}$ (106)+$N_{SD\_Short}$ (26): $N_{SD\_Short}$ for 996+484 is exactly $N_{SD\_Short}$ (996)+$N_{SD\_Short}$ (484): $N_{SD\_Short}$ for 242+ 484+996 is exactly $N_{SD\_Short}$ (242)+$N_{SD\_Short}$ (484)+ $N_{SD\_Short}$ (996): $N_{SD\_Short}$ for 484+2×996 is exactly $N_{SD\_Short}$ (484)+$N_{SD\_Short}$ (996)+$N_{SD\_Short}$ (996): $N_{SD\_Short}$ for 3×996 is exactly $N_{SD\_Short}$ (996)+$N_{SD\_Short}$ (996)+ $N_{SD\_Short}$ (996): $N_{SD\_Short}$ for 484+3×996 is exactly $N_{SD\_Short}$ (484)+$N_{SD\_Short}$ (996)+$N_{SD\_Short}$ (996)+$N_{SD\_Short}$ (996): $N_{SD\_Short}$ for 4×996 is exactly $N_{SD\_Short}$ (996)+$N_{SD\_Short}$ (996)+$N_{SD\_Short}$ (996)+$N_{SD\_Short}$ (996).

In an exemplary implementation of the communication device, the communication device is configured to add a single padding bit after every 2×$N_{DBPS}$ for the combination of RU values equal to 106+26, DCM switched-on, single stream and binary phase shift keying modulation with coderate ½.

In an exemplary implementation of the communication device, the extended set of PE parameters is defined for at least one of an extended modulation scheme of 4K-QAM or higher, an extended number of spatial streams greater than 8 and an extended bandwidth of 240 MHz, 320 MHz or higher.

This provides the advantage that the communication device is suitable to be performed with the new features defined by the EHT WiFi standard.

In an exemplary implementation of the communication device, the extended set of PE parameters is based on an extension of a PHY packet extension, PPE, thresholds field defined for the second radio transmission technology, wherein the PPE thresholds field is extended by extending the NSTS subfield size to at least 4 bits and the RU index bitmask size to at least 6 bits.

This provides the advantage that the communication device is compliant to the new features defined by the IEEE 802.11be standard.

NSTS is a subfield of PPE thresholds field that defines the maximum number of space time streams supported by a Station.

In an exemplary implementation of the communication device, the extended set of PE parameters is based on an extension of a resource unit allocation index field defined for the second radio transmission technology, wherein the extended resource unit allocation index field comprises extended resource unit allocation sizes of 3×996 and/or 4×996 or higher.

This provides the advantage that the communication device is compliant to the new features defined by the IEEE 802.11be standard.

In an exemplary implementation of the communication device, the extended set of PE parameters is based on an extension of a constellation index field defined for the second radio transmission technology, wherein the extended constellation index field comprises one or more extended constellations of 4096-QAM or higher.

This provides the advantage that the communication device is compliant to the new features defined by the IEEE 802.11be standard, in particular with a 4K-QAM constellation.

In an exemplary implementation of the communication device, the extended set of PE parameters is based on reusing a PHY packet extension, PPE, thresholds field defined for the second radio transmission technology, wherein the PPE thresholds field is defined for modulation schemes less or equal than 1K-QAM, a number of spatial streams less or equal than 8 and resource unit sizes less or equal than 2×996.

In an exemplary implementation of the communication device, the extended set of PE parameters is based on reusing a PPE thresholds field defined for the second radio transmission technology and based on using a single bit indicating the use of a modulation scheme of 4K-QAM, or indicating a constellation of 4096-QAM in an extended constellation index field without using the single bit.

This provides the advantage that the communication device is compliant to the new features defined by the IEEE 802.11be standard, in particular with a 4K-QAM constellation.

Alternatively, the indication of the constellation by using the single bit is not used. That means, 4K-QAM can be indicated in EHT (802.11be) without any additional bit. So, the only change is the additional value of 4096 in the constellation index table (see Table 3 below). This option is backward compatible with HE (802.11ax) because an HE device will consider the indication "6" as "NONE" anyway because it does not know 4K-QAM.

In an exemplary implementation of the communication device, the extended set of PE parameters is based on: using a single bit indicating the use of a modulation scheme of 4K-QAM, including a constellation of 4096-QAM in an extended constellation index field, and extending a PPE thresholds field defined for the second radio transmission technology by extending the NSTS subfield size to at least 4 bits in order to support up to 16 spatial streams, or indicating a constellation of 4096-QAM in the extended constellation index field without using the single bit.

This provides the advantage that the communication device is compliant to the new features defined by the IEEE 802.11be standard, in particular with a 4K-QAM constellation and a number of 16 spatial streams. Alternatively, the indication of the constellation by using the single bit is not used as mentioned above.

In an exemplary implementation of the communication device, the extended set of PE parameters is based on: using a single bit indicating the use of a modulation scheme of 4K-QAM, including a constellation of 4096-QAM in an extended constellation index field, and extending a PPE thresholds field defined for the second radio transmission technology by extending the size of a resource unit index bitmask to at least 6 bits, or indicating a constellation of 4096-QAM in the extended constellation index field without using the single bit.

This provides the advantage that the communication device is compliant to the new features defined by the IEEE 802.11be standard, in particular with a 4K-QAM constellation. Alternatively, the indication of the constellation by using the single bit is not used as mentioned above.

In an exemplary implementation of the communication device, the extended set of PE parameters is based on: using a single bit indicating the use of a modulation scheme of 4K-QAM, including a constellation of 4096-QAM in an extended constellation index field, and extending a PPE thresholds field defined for the second radio transmission technology by extending the NSTS subfield size to at least 4 bits and the RU index bitmask size to at least 6 bits, or indicating a constellation of 4096-QAM in the extended constellation index field without using the single bit.

This provides the advantage that the communication device is compliant to the new features defined by the IEEE 802.11be standard, in particular with a 4K-QAM constellation. Alternatively, the indication of the constellation by using the single bit is not used as mentioned above.

According to a second aspect, the disclosure relates to a communication method, comprising: transmitting and/or receiving a data frame based on a set of pre&post-Forward Error Correction, FEC, parameters and a set of packet extension, PE, parameters, wherein the set of pre&post-FEC parameters is based on an extension of a set of pre&post-FEC parameters defined for a second radio transmission technology with respect to a size of resource units, RUs, supported by a first radio transmission technology, wherein the set of pre&post-FEC parameters is based on a combination of RUs that is supported by the first radio transmission technology and wherein the set of PE parameters is based on an extension of a set of PE parameters defined for the second radio transmission technology with respect to a constellation size, a number of total space time streams and a resource unit, RU, allocation size supported by the first radio transmission technology.

By transmitting/receiving a data frame based on such a new definition of pre&post-FEC parameters and PE parameters, usage of such a communication method improves performance of radio transmission in advanced communication schemes such as EHT WiFi, e.g. according to IEEE 802.11be. This new definition of packet extension and pre&post Forward Error Correction padding is compliant to the new radio transmission standard, for example EHT WiFi, e.g. according to IEEE 802.11be.

According to a third aspect, the disclosure relates to a computer program product including computer executable code or computer executable instructions that, when executed, causes at least one computer to execute the method according to the second aspect. Such a computer program product may include a non-transient readable storage medium storing program code thereon for use by a processor, the program code comprising instructions for performing the methods or the computing blocks as described hereinafter.

Using such a computer program product improves performance of radio transmission in advanced communication schemes such as EHT WiFi, e.g. according to IEEE 802.11be.

BRIEF DESCRIPTION OF THE DRAWINGS

Further embodiments of the disclosure will be described with respect to the following figures, in which:

FIG. 4 shows guidelines for decision of packet extension padding duration in IEEE 802.11ax:

FIG. 6A shows a schematic diagram illustrating 4K-QAM additional capability bit according to the disclosure:

FIG. 6B shows a schematic diagram illustrating 4K-QAM additional capability bits according to the disclosure:

DETAILED DESCRIPTION OF EMBODIMENTS

Figure 1:
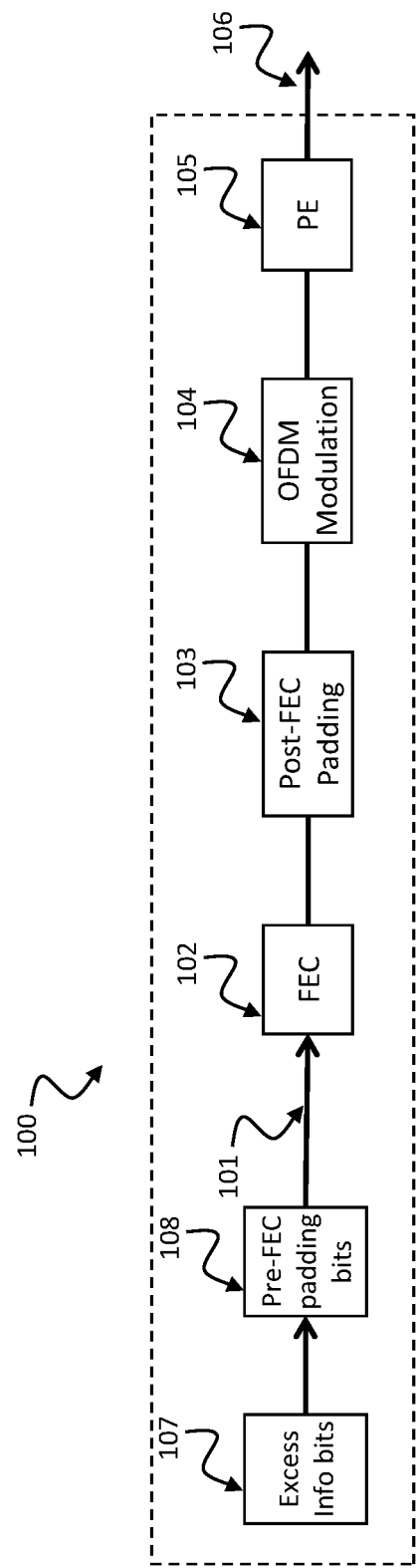
FIG. 1 shows a schematic diagram 100 illustrating a communication device 100 according to the disclosure.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods, devices and systems described herein may be implemented in wireless communication schemes, in particular communication schemes according to WiFi communication standards according to IEEE 802.11, in particular 802.11n/ac/ax/be amendments. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender). However, devices described herein are not limited to transmit and/or receive radio signals, also other signals designed for transmission in deterministic communication networks may be transmitted and/or received.

The devices and systems described herein may include processors or processing devices, memories and transceivers, i.e. transmitters and/or receivers. The term "processor" or "processing device" describes any device that can be utilized for processing specific tasks (or blocks or steps). A processor or processing device can be a single processor or a multi-core processor or can include a set of processors or can include means for processing. A processor or processing device can process software or firmware or applications etc.

Communication devices are described in the following. Although, the new mechanisms are described with a focus on WiFi technologies, in particular IEEE 802.11ax and IEEE 802.11be, the new mechanisms may be applied to any new radio transmission schemes in which data fields are updated to support the new standard. It is understood that these new mechanisms described hereinafter are not limited to WiFi radio transmission.

FIG. 1 shows a schematic diagram 100 illustrating a communication device 100 according to the disclosure. Such a communication device 100 is configured to perform OFDM transmission (and/or reception). An example of an OFDM transmission chain for a last data symbol to be transmitted is shown in FIG. 1. Excess Information bits 107 are provided to a Pre-FEC padding block 108 that applies Pre-FEC padding bits to the Excess Information bits 107 according to Pre-FEC padding. The resulting data 101 is applied to Forward Error Correction (FEC) 102, Post-FEC Padding 103, OFDM modulation 104 and Packet Extension (PE) 105 to provide the last data symbol 106 for transmission. Note that FIG. 1 only illustrates the last data symbol to be transmitted. Pre/post-FEC and PE as illustrated in FIG. 1 only relates to the last symbol. The analog blocks are used in the receiver to perform reception of data symbols 106 transmitted over radio channel.

In this disclosure, new mechanisms to extend Pre&post-FEC Padding 103 and PE 105 to new requirements of novel radio transmission standards are described. For example, such requirements are 240 MHz/320 MHz bandwidth, multi-RUs and 4K-QAM as introduced in IEEE 802.11bc for WiFi transmission.

The communication device 100 is configured to transmit and/or receive a data frame based on a set of pre&post-Forward Error Correction, FEC, parameters and a set of packet extension, PE, parameters. The set of pre&post-FEC parameters is based on an extension of a set of pre&post-FEC parameters defined for a second radio transmission technology with respect to a size of resource units, RUs, supported by a first radio transmission technology, wherein the set of pre&post-FEC parameters is based on a combination of RUs that is supported by the first radio transmission technology. The set of PE parameters is based on an extension of a set of PE parameters defined for the second radio transmission technology with respect to a constellation size, a number of total space time streams and a resource unit, RU, allocation size supported by the first radio transmission technology.

The first and second radio transmission technologies can be WiFi technologies, the second radio transmission technology can be an existing WiFi technology, while the first radio technology can be a new WiFi technology, e.g. a new WiFi technology having higher bandwidth, multi-resource units and/or higher constellation scheme. For example, the first radio transmission technology can be 802.11be WiFi and the second radio transmission technology can be 802.11ax WiFi.

The first and second radio transmission technologies can be the same (with different settings) or different (with different capabilities).

A multiple RU as defined by the new first radio transmission technology is formed from a combination of two or more RUs defined by the old second radio transmission technology.

The communication device 100 may be configured to determine where a post-padding begins in the data frame based on the set of pre&post-FEC parameters, wherein the set of pre&post-FEC parameters is based on: an integer number of data subcarriers for a last symbol of the data frame, $N_{SD\_Short}$, as defined by an extended $N_{SD\_Short}$ table, wherein the extended $N_{SD\_Short}$ table is an extension of a $N_{SD\_Short}$ table defined by the second radio transmission technology with respect to additional values of $N_{SD\_Short}$ defined by the first radio transmission technology, an integer number of coded bits per symbol for the last symbol of the data frame, $N_{CBPS\_Short}$, wherein $N_{CBPS\_Short}$ depends on $N_{SD\_Short}$, and an integer number of data bits per symbol for the last symbol of the data frame, $N_{DBPS\_Short}$, wherein $N_{DBPS\_Short}$ depends on $N_{CBPS\_Short}$.

The set of pre&post-FEC parameters may be based on an extension of an $N_{SD\_Short}$ table defined for the second radio transmission technology with respect to combinations of RU values supported by the first radio transmission technology, wherein the $N_{SD\_Short}$ table comprises predefined numbers of $N_{SD\_Short}$ values (see Table 2 shown below with respect to Example #1 described below with respect to FIGS. 5 to 9).

The extended $N_{SD\_Short}$ table may define the numbers of $N_{SD\_Short}$ values for a dual-carrier modulation, DCM, switched on and/or a DCM switched off (see Table 2 shown below with respect to Example #1 described below with respect to FIGS. 5 to 9).

The extended $N_{SD\_Short}$ table may include one or more of the following combinations of RU values: 52+26, 106+26, 484+242, 996+484, 242+484+996, 484+2×996, 3×996, 484+3×996, 4×996 (see Table 2 shown below with respect to Example #1 described below with respect to FIGS. 5 to 9).

For example, a value of $N_{SD\_Short}$ for a combination of a first RU and a second RU that is supported by the first radio transmission technology may correspond to an addition of an $N_{SD\_Short}$ value for the first RU and an $N_{SD\_Short}$ value for the second RU, the first RU and the second RU being supported by the second radio transmission technology.

Possible combinations of RUs are exemplarily described in the following: For example: $N_{SD\_Short}$ for 484+242 is exactly $N_{SD\_Short}$ (242)+$N_{SD\_Short}$ (484): $N_{SD\_Short}$ for 52+26 is exactly $N_{SD\_Short}$ (52)+$N_{SD\_Short}$ (26): $N_{SD\_Short}$ for 106+26 is exactly $N_{SD\_Short}$ (106)+$N_{SD\_Short}$ (26): $N_{SD\_Short}$ for 996+484 is exactly $N_{SD\_Short}$ (996)+$N_{SD\_Short}$ (484): $N_{SD\_Short}$ for 242+484+996 is exactly $N_{SD\_Short}$ (242)+ $N_{SD\_Short}$ (484)+$N_{SD\_Short}$ (996): $N_{SD\_Short}$ for 484+2×996 is exactly $N_{SD\_Short}$ (484)+$N_{SD\_Short}$ (996)+$N_{SD\_Short}$ (996): $N_{SD\_Short}$ for 3×996 is exactly $N_{SD\_Short}$ (996)+$N_{SD\_Short}$ (996)+$N_{SD\_Short}$ (996): $N_{SD\_Short}$ for 484+3×996 is exactly $N_{SD\_Short}$ (484)+$N_{SD\_Short}$ (996)+$N_{SD\_Short}$ (996)+$N_{SD\_Short}$ (996): $N_{SD\_Short}$ for 4×996 is exactly $N_{SD\_Short}$ (996)+ $N_{SD\_Short}$ (996)+$N_{SD\_Short}$ (996)+$N_{SD\_Short}$ (996).

The communication device 100 may be configured to add a single padding bit after every $2 \times N_{DBPS}$ for the combination of RU values equal to 106+26, DCM switched-on, single stream and binary phase shift keying modulation with code-rate ½ (see Example #2 described below with respect to FIGS. 5 to 9).

The pre&post-FEC parameters are also called "pre&post-FEC padding parameters" since these are the padding bits for the last symbol of a data frame. With pre&post-FEC padding, portions of ¼ of the last OFDM symbol (i.e. ¼, ½, ¾) are padded after encoding; these portions need not be decoded.

The extended set of PE parameters may be defined for at least one of an extended modulation scheme of 4K-QAM or higher, an extended number of spatial streams greater than 8 and an extended bandwidth of 240 MHZ, 320 MHz or higher (see Example #3 described below with respect to FIGS. 5 to 9).

The extended set of PE parameters may be based on an extension of a PHY packet extension, PPE, thresholds field defined for the second radio transmission technology, wherein the PPE thresholds field is extended by extending the NSTS subfield size to at least 4 bits and the RU index bitmask size to at least 6 bits (see Example #3a described below with respect to FIGS. 5 to 9). NSTS is a subfield of PPE thresholds field that defines the maximum number of space time streams supported by a Station.

The extended set of PE parameters may be based on an extension of a resource unit allocation index field defined for the second radio transmission technology, wherein the extended resource unit allocation index field comprises extended resource unit allocation sizes of 3×996 and/or 4×996 or higher (see Example #3a described below with respect to FIGS. 5 to 9).

The extended set of PE parameters may be based on an extension of a constellation index field defined for the second radio transmission technology, wherein the extended constellation index field comprises one or more extended constellations of 4096-QAM or higher (see Example #3a described below with respect to FIGS. 5 to 9).

The extended set of PE parameters may be based on reusing a PHY packet extension, PPE, thresholds field defined for the second radio transmission technology, wherein the PPE thresholds field is defined for modulation schemes less or equal than 1K-QAM, a number of spatial streams less or equal than 8 and resource unit sizes less or equal than 2×996 (see Example #3b described below with respect to FIGS. 5 to 9).

The extended set of PE parameters may be based on reusing a PPE thresholds field defined for the second radio transmission technology and based on using a single bit indicating the use of a modulation scheme of 4K-QAM (see Example #3c described below with respect to FIGS. 5 to 9).

The extended set of PE parameters may be based on: using a single bit indicating the use of a modulation scheme of 4K-QAM, including a constellation of 4096-QAM in an extended constellation index field, and extending a PPE thresholds field defined for the second radio transmission technology by extending the NSTS subfield size to at least 4 bits in order to support up to 16 spatial streams (see Example #3d described below with respect to FIGS. 5 to 9).

The extended set of PE parameters may be based on: using a single bit indicating the use of a modulation scheme of 4K-QAM, including a constellation of 4096-QAM in an extended constellation index field, and extending a PPE thresholds field defined for the second radio transmission technology by extending the size of a resource unit index bitmask to at least 6 bits (see Example #3e described below with respect to FIGS. 5 to 9).

The extended set of PE parameters may be based on: using a single bit indicating the use of a modulation scheme of 4K-QAM, including a constellation of 4096-QAM in an extended constellation index field, and extending a PPE thresholds field defined for the second radio transmission technology by extending the NSTS subfield size to at least 4 bits and the RU index bitmask size to at least 6 bits (see Example #3f described below with respect to FIGS. 5 to 9).

Figure 2:
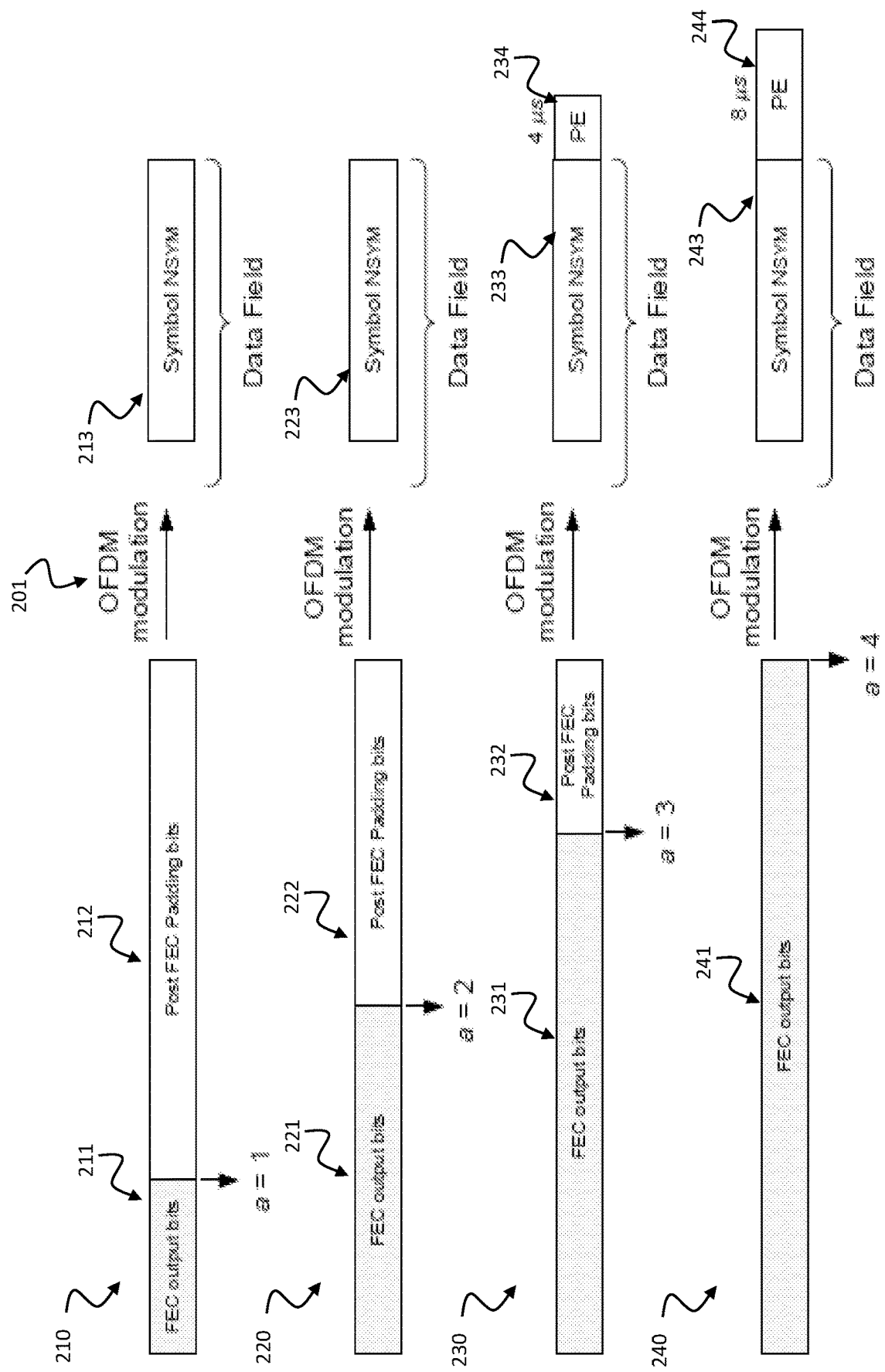
FIG. 2 shows a schematic diagram illustrating Post-FEC and PE in IEEE 802.11ax.

FIG. 2 shows a schematic diagram illustrating Post-FEC and PE in IEEE 802.11ax.

In order to relax processing requirements with 4× symbol duration, considering SIFS (Short Interframe Space) time for responding, some padding at the end of the packet that does not contain any information is inserted. This padding artificially increases the packet, allowing the receiver to complete the decoding processing. In 802.11ax Packet Extension (PE) and pre&post-FEC padding were introduced. These 2 mechanisms considered the maximal combination of number of spatial streams (8), RU size (2×996) and QAM modulation (1K). As 802.11be is going to support higher values, i.e. 16 spatial streams, 4×996 and 4K-QAM, the definitions, signalling and usage of PE & pre&post-FEC padding needs to be revised as presented in this disclosure.

In the current 802.11ax standard (IEEE P802.11ax™/ D6.1), there are 4 sizes of resource units (RUs) that are relevant to Packet Extension: 242, 484, 996, and 2×996. In addition, up to eight spatial streams are supported and the highest supported modulation is 1K-QAM. Therefore, theoretically, a receiver may need to process a PPDU (Physical Protocol Data Unit) that contains 8 spatial stream, over 160 MHZ (RU=2×996) with 1K-QAM modulation. This case may be laborious and require some extra time and/or extra HW to complete.

In order to relax processing requirements with 4× symbol duration, considering SIFS time for responding, 802.11ax introduced Packet Extension (PE) and pre&post-FEC padding.

In FIG. 2, four scenarios 210, 220, 230, 240 are shown having different lengths of padding bits in the last OFDM symbol of the packet (left side of FIG. 2) and packet extension segment that may follow the last OFDM symbol (right side of FIG. 2). In all scenarios it is assumed that the packet consists of $N_{SYM}$ OFDM symbols so that the last OFDM symbol's index is $N_{SYM}$. In the first scenario 210, number of FEC output bits 211 in the last OFDM symbol occupy ¼ of the symbol and is small with respect to number of Post FEC Padding bits 212 which occupy ¾ of the symbol. After OFDM modulation 201, data field 213 in the last OFDM symbol is provided such that no packet extension is required, therefore not applied.

In the second scenario 220, number of FEC output bits 221 in the last OFDM symbol occupy ½ of the symbol and is about the same length than number of Post FEC Padding bits 222 which occupy ½ of the symbol as well. After OFDM modulation 201, data field 223 in the last OFDM symbol is provided such that still no packet extension is required, therefore not applied.

In the third scenario 230, number of FEC output bits 231 in the last OFDM symbol occupy ¾ of the symbol and is long with respect to number of Post FEC Padding bits 232 which occupy ¼ of the symbol. After OFDM modulation 201, data field 233 in the last OFDM symbol is provided and a packet extension, PE 234 of 4 microseconds is required, therefore appended to data field 233.

In the fourth scenario 240, number of FEC output bits 241 in the last OFDM symbol occupy the whole symbol, therefore is provided without Post FEC Padding bits. After OFDM modulation 201, data field 243 in the last OFDM symbol is provided and a packet extension, PE 244 of 8 microseconds is required, therefore appended to data field 243.

With Pre&post-FEC padding, portions of ¼ of the last OFDM symbol (i.e. ¼, ½, ¾) are padded after encoding: these portions need not to be decoded.

FIG. 2 shows the post-FEC and PE defined in 802.11ax for 8 usec (microseconds) nominal packet padding.

There are several parameters defined in the 802.11ax specification, which are used to determine where (post-FEC) padding begins:

Parameter $N_{SD\_Short}$, defined explicitly in the 802.11ax specification and shown here below in Table 1, defines the number of tones, used within the last OFDM symbol, and is always approximately ¼ the number of tones: the rest of the tones within the last symbol are used as post-FEC. Parameter $N_{CBPS\_Short}$ is dependent on $N_{SD\_Short}$. Parameter $N_{DBPS\_Short}$ is dependent on $N_{CBPS\_Short}$. Note that not all RU sizes are an integer multiple of 4. The values of $N_{SD\_Short}$ were also chosen such that $N_{CBPS\_Short}$, $N_{DBPS\_Short}$ and $N_{DBPS\_Short}/N_{ES}$ are integers.

TABLE 1 below shows the values of parameter $N_{SD\_Short}$, depending on RU size and DCM (Dual Carrier Modulation) switched on (DCM = 1) or switched-off (DCM = 0).

| | $N_{SD\_Short}$ | |
|---|---|---|
| RU Size | DCM = 0 | DCM = 1 |
| 26-tone | 6 | 2 |
| 52-tone | 12 | 6 |
| 106-tone | 24 | 12 |
| 242-tone | 60 | 30 |
| 484-tone | 120 | 60 |
| 996-tone | 240 | 120 |
| 2 × 996-tone | 492 | 246 |

Table 1: NSD_Short for various RU sizes

DCM (Dual Carrier Modulation) is a technique, supported in IEEE 802.11ax, where the same bits are transmitted twice (in two modulated QAMs on two tones that are relatively far from each-other) in order to increase the diversity. This means the effective coding rate is halved, compared to when DCM is not used. There are two cases where the number of info data bits per symbol ($N_{DBPS}$) used within an OFDM symbol, for DCM=1, is not exactly half the corresponding number of coded data bits per symbol ($N_{CBPS}$) for DCM=0 (these are MCS 0 with RU size 106-tones and MCS 0 with RU size 242-tones). Hence, the 802.11ax spec mandates that for these two cases, an additional padding bit is added to every OFDM symbol, and this bit can be set to 0 or 1.

Figure 3A:
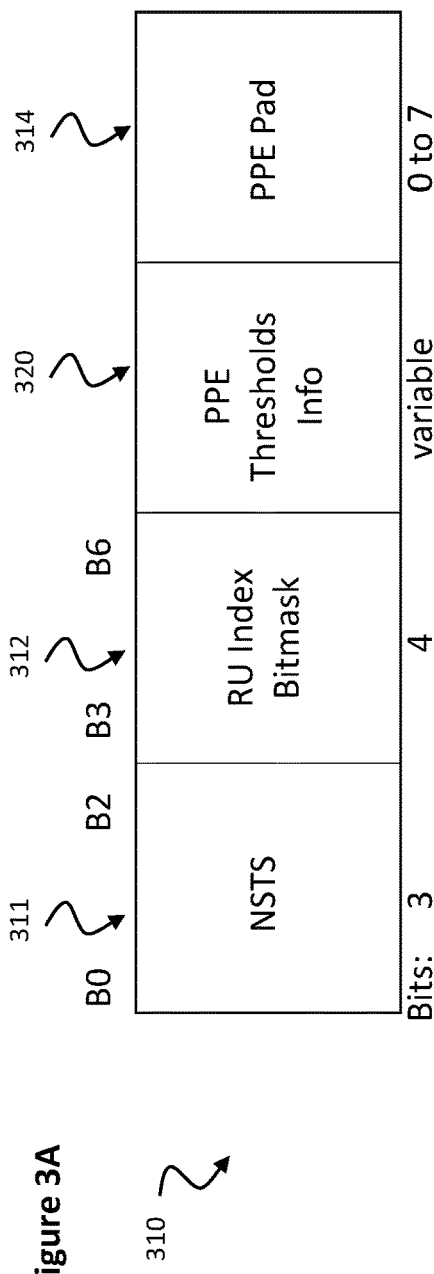
FIG. 3A shows a schematic diagram illustrating PPE Threshold field in IEEE 802.11ax.

FIG. 3A shows a schematic diagram illustrating PPE Threshold field 310 in IEEE 802.11ax.

The PPE Threshold field 310 includes a NSTS field 311 of 3 bits size indicating the number of stations, a RU Index Bitmask 312 of 4 bits size, a PPE Thresholds Info field 320 of variable size and a PPE Pad field 314 of size 0 to 7 bits.

Packet Extension Threshold can be defined as follows:

A Station (STA) can report its required nominal packet extension for each combination of $N_{STS}$, RU size and modulation. The STA reports a PPE Thresholds field 310, as shown in FIG. 2, where:

$N_{STS}$, 311, is the maximum number of STSs defined in the report;

RU index 312 defines the RU sizes for which the thresholds are included as shown in Table 9-321e of IEEE 802.11ax (see below).

TABLE 9

321e of IEEE 802.11ax-RU allocation index

| RU allocation index | RU allocation size |
|---|---|
| 0 | 242 |
| 1 | 484 |
| 2 | 996 |
| 3 | 2 × 996 |

Figure 3B:
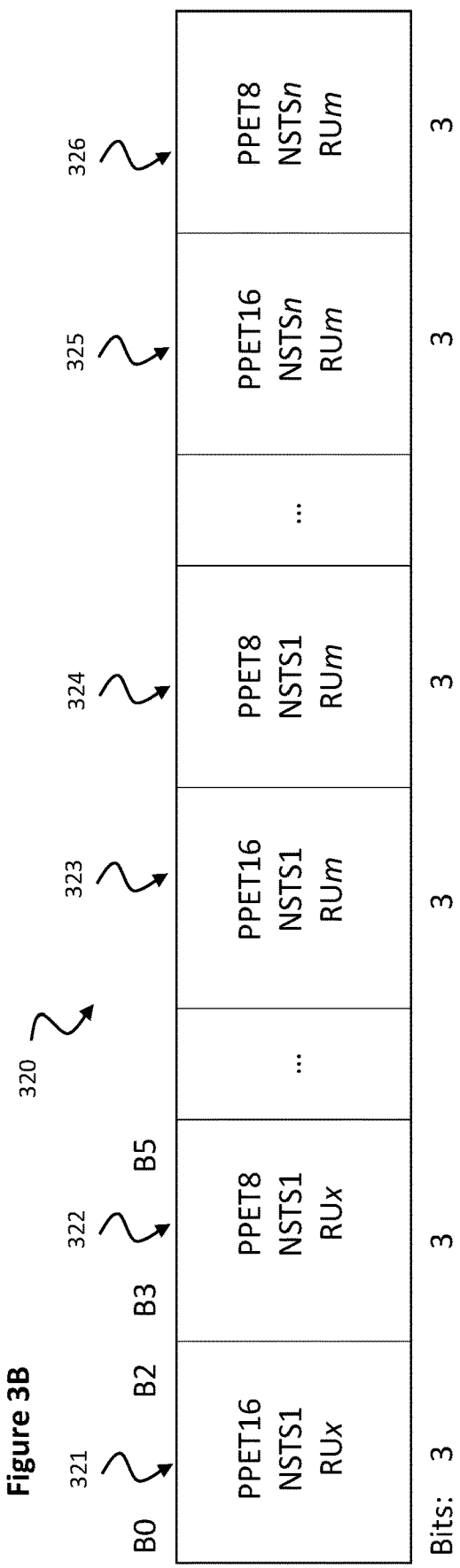
FIG. 3B shows a schematic diagram illustrating PPE Threshold Info field in IEEE 802.11ax.

PPE Thresholds defines 2×3 bits per combination of RU and $N_{STS}$, where each 3 bits corresponds to a modulation, as shown in FIG. 3B.

A STA receiving this frame compares the values for PPET8 and PPET16 and determines nominal packet padding for each combination.

After receiving the PPE Thresholds field from a second STA, the first STA uses the combination of the PPET8 $N_{STSn}$ $RU_b$ subfield and PPET16 $N_{STSn}$ $RU_b$ subfield values to determine the nominal packet padding for HE PPDUs that are transmitted to the second STA using $N_{STS}$=n and an RU allocation corresponding to RU Allocation Index b, for each value of $N_{STS}$ and RU specified by the field (see FIG. 4). The nominal packet padding is used in computing the PE field duration (see 27.3.13 of 802.11ax spec (Packet extension)).

FIG. 3B shows a schematic diagram illustrating PPE Threshold Info field 320 in IEEE 802.11ax. The PPE Threshold Info field 320 includes a PPET16 NSTS1 RUx field 321 of 3 bits size, a PPET8 NSTS1 RUx field 322 of 3 bits size, further bit fields, a PPET16 NSTS1 RUm field 323 of 3 bits size, a PPET8 NSTS1 RUm field 324, further bit fields, a PPET16 NSTSn RUm field 325 of 3 bits size and a PPET8 NSTSn RUm field 326 of 3 bits size.

FIG. 4 shows guidelines 400 for decision of packet extension padding duration in IEEE 802.11ax. FIG. 4 shows how a transmitting STA decides which PE is required by the receiving STA based on the thresholds field info.

However, the above procedure is limited to the number of spatial streams, the bandwidth and the highest modulation defined in IEEE 802.11ax. The new WiFi standard IEEE 802.11be will support the following advanced features: 240 MHz/320 MHz: Multi-RUs (e.g. RU242+RU484 are combined to a new RU with a new size): 4K-QAM: and 16 spatial streams. The current WiFi specification IEEE 802.11ax does not have a solution for these cases, therefore it cannot be used as is in the new WiFi standard IEEE 802.11be.

In the following, appropriate pre&post-FEC and packet extension mechanisms are introduced to support the new WiFi standard IEEE 802.11be. These mechanisms according to the disclosure are suitable to the new features that are added to the new standard IEEE 802.11be. FIGS. 5 to 9 illustrate the new frame formats for using these new pre&post-FEC and packet extension mechanisms.

Figure 5:
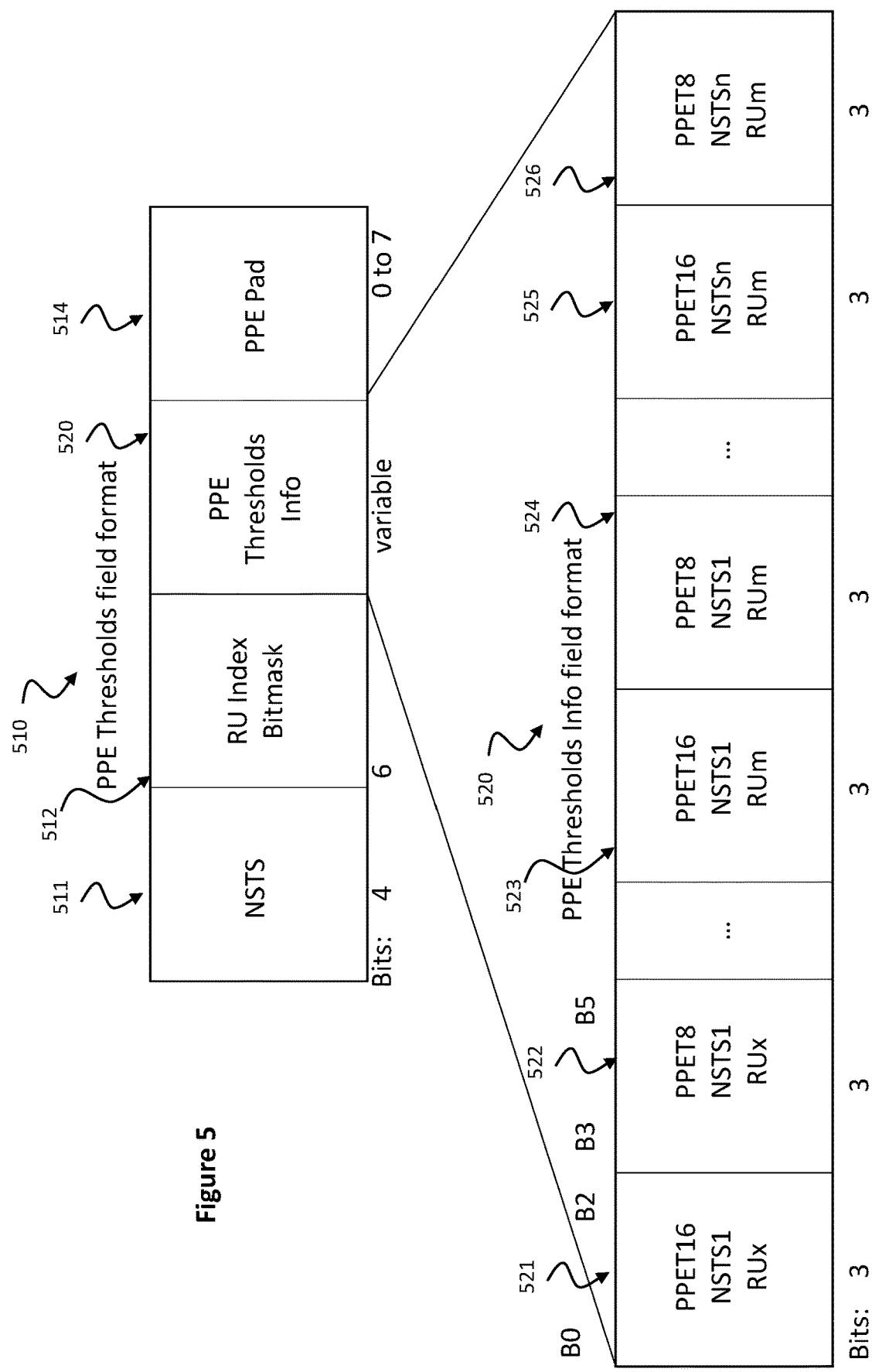
FIG. 5 shows a schematic diagram illustrating PPE Thresholds field format together with a PPE Thresholds Info field format according to the disclosure.

In particular, FIG. 5 shows the new PPE Thresholds field format 510 together with the new PPE Thresholds Info field format 520. The PPE Thresholds field format 510 includes a 4 bit $N_{STS}$ 511, a 6 bit RU Index Bitmask 512, a variable PPE Thresholds Info field 520) and a 0 to 7 bit PPE Pad field 514. The PPE Thresholds Info field 520) includes a 3 bit PPET16 $N_{STS1}$ $RU_x$ field 521, a 3 bit PPET8 $N_{STS1}$ $RU_x$ field 522, further fields, a 3 bit PPET16 $N_{STS1}$ $RU_m$ field 523, a 3 bit PPET8 $N_{STS1}$ $RU_m$ field 524, further fields, a 3 bit PPET16 $N_{STSn}$ $RU_m$ field 525 and a 3 bit PPET8 $N_{STSn}$ $RU_m$ field 526.

FIG. 6A shows the new frame format 610 with 4K-QAM additional capability bit. The new frame format 610 includes a 1 bit 4K-QAM Delta field 611 and a 7 bit PPE Pad field 612. FIG. 6B shows the new frame format 620 with 4K-QAM additional capability bits. The new frame format 620 includes a variable bit size 4K-QAM Delta field 621 and a 0 to 7 bit PPE Pad field 622.

Figure 7A:
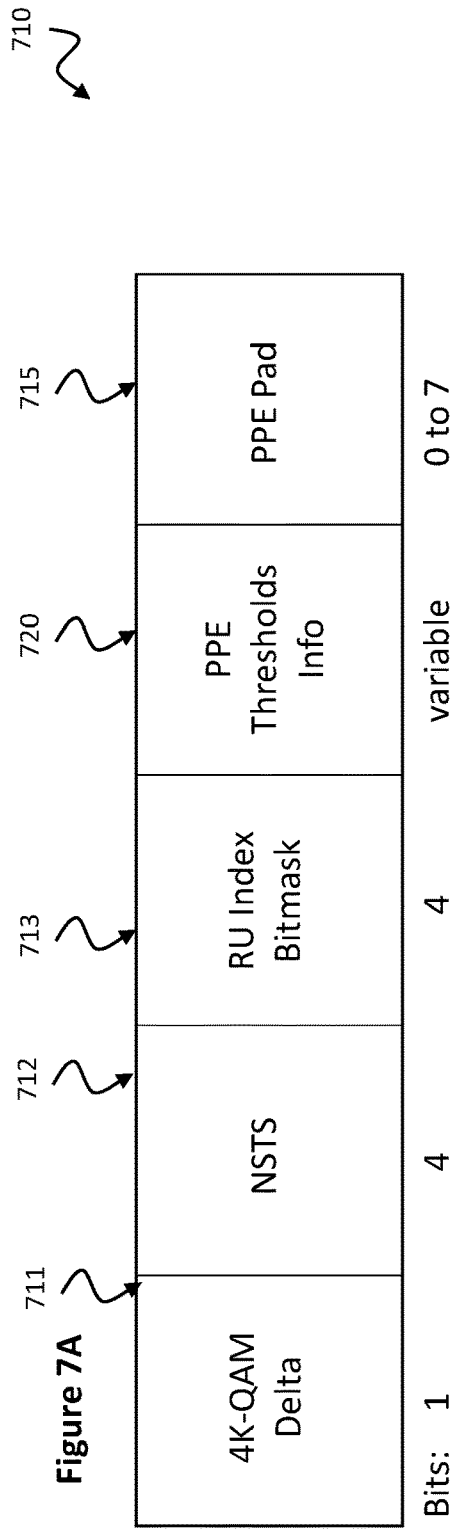
FIG. 7A shows a schematic diagram illustrating PPE Thresholds field format supporting 4K-QAM and more than 8 spatial streams according to the disclosure.

FIG. 7A shows the new PPE Thresholds field format 710 supporting 4K-QAM and more than 8 spatial streams. The PPE Thresholds field format 710 includes a 1 bit 4K-QAM Delta field 711, a 4 bit $N_{STS}$ 712, a 4 bit RU Index Bitmask 713, a variable bit-size PPE Thresholds Info field 720 and a 0 to 7 bit PPE Pad field 715.

Figure 7B:
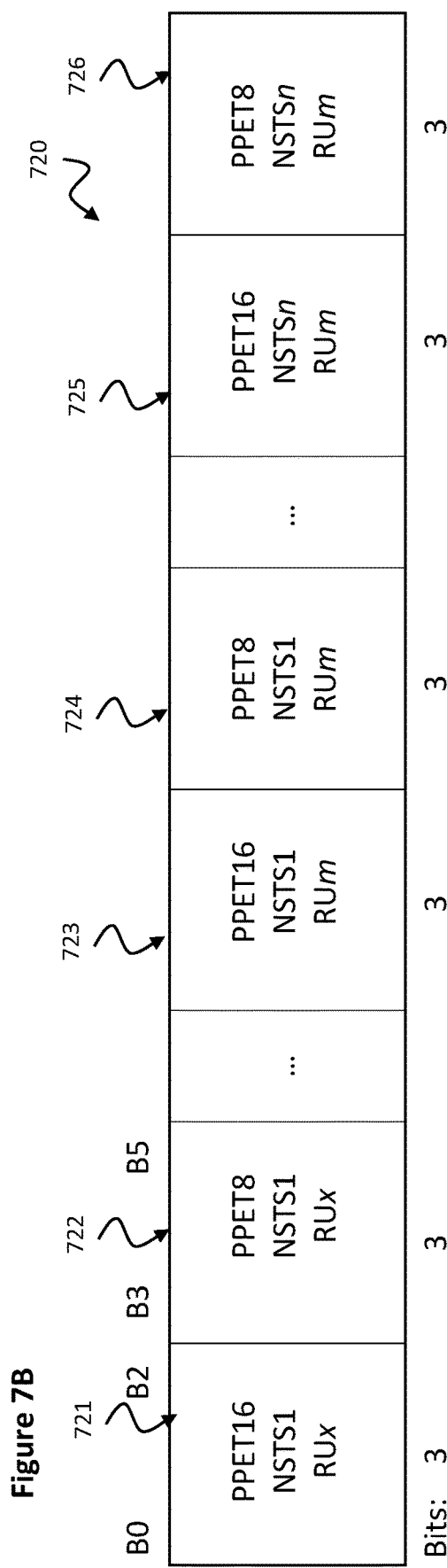
FIG. 7B shows a schematic diagram illustrating PPE Thresholds Info field format supporting 4K-QAM and more than 8 spatial streams according to the disclosure.

FIG. 7B shows the new PPE Thresholds Info field format 720 supporting 4K-QAM and more than 8 spatial streams. The PPE Thresholds Info field 720 includes a 3 bit PPET16 $N_{STS1}$ $RU_x$ field 721, a 3 bit PPET8 $N_{STS1}$ $RU_x$ field 722, further fields, a 3 bit PPET16 $N_{STS1}$ $RU_m$ field 723, a 3 bit PPET8 $N_{STS1}$ $RU_m$ field 724, further fields, a 3 bit PPET16 $N_{STSn}$ $RU_m$ field 725 and a 3 bit PPET8 $N_{STSn}$ $RU_m$ field 726.

Figure 8A:
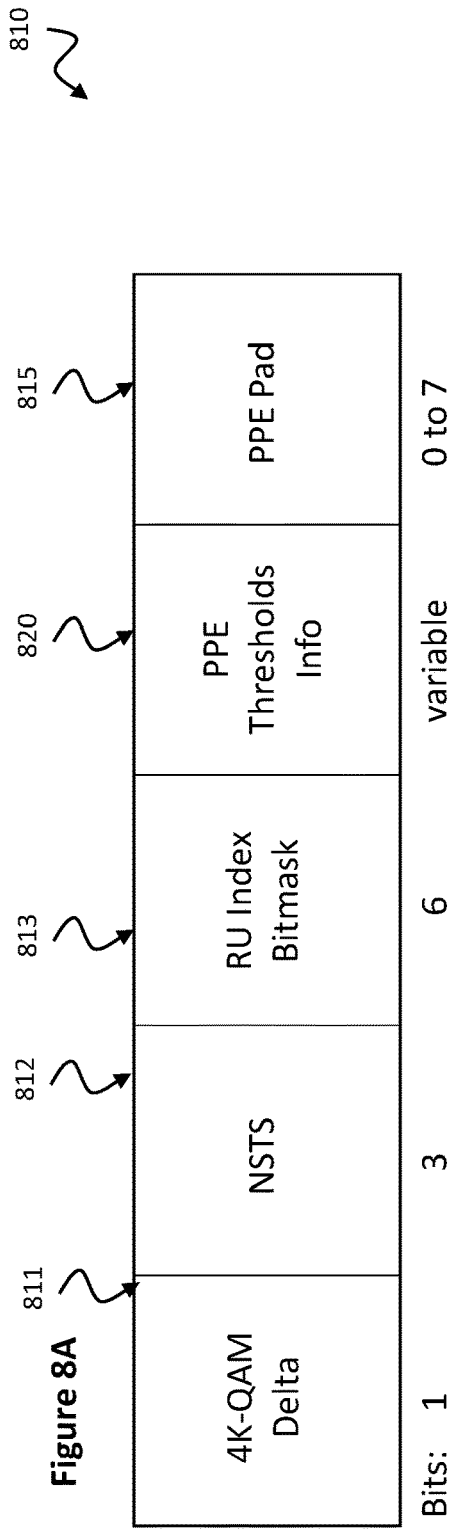
FIG. 8A shows a schematic diagram illustrating PPE Thresholds field format supporting 4K-QAM and additional RUs according to the disclosure.

FIG. 8A shows the new PPE Thresholds field format 810 supporting 4K-QAM and additional RUs. The PPE Thresholds field format 810 includes a 1 bit 4K-QAM Delta field 811, a 3 bit $N_{STS}$ 812, a 6 bit RU Index Bitmask 813, a variable bit-size PPE Thresholds Info field 820) and a 0 to 7 bit PPE Pad field 815.

Figure 8B:
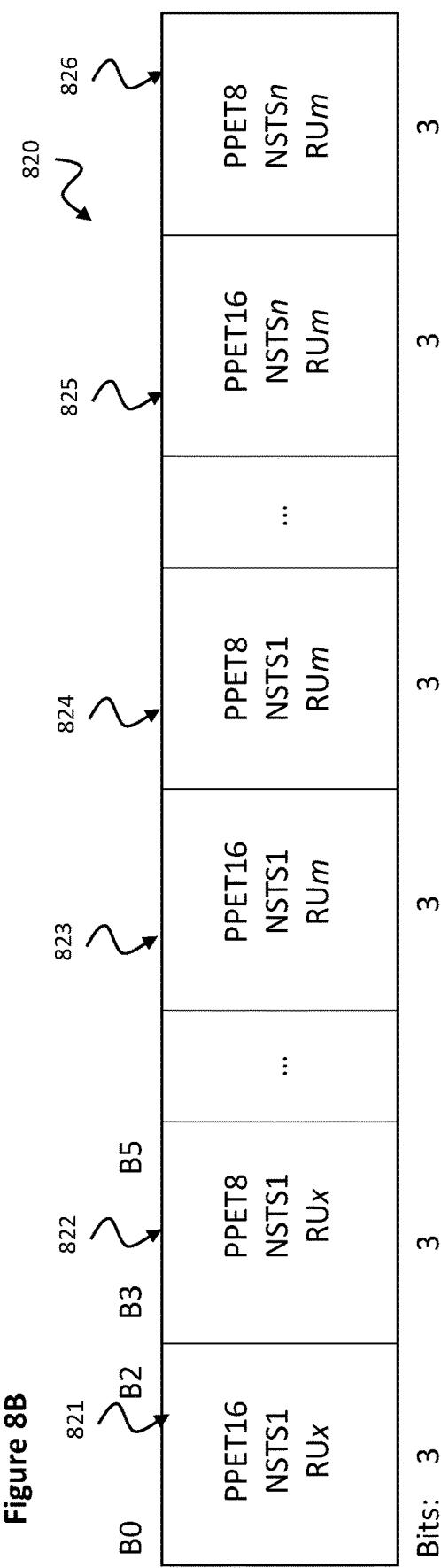
FIG. 8B shows a schematic diagram illustrating PPE Thresholds Info field format supporting 4K-QAM and additional RUs according to the disclosure.

FIG. 8B shows the new PPE Thresholds Info field format 820 supporting 4K-QAM and additional RUs. The PPE Thresholds Info field 820 includes a 3 bit PPET16 $N_{STS1}$ $RU_x$ field 821, a 3 bit PPET8 $N_{STS1}$ $RU_x$ field 822, further fields, a 3 bit PPET16 $N_{STS1}$ $RU_m$ field 823, a 3 bit PPET8 $N_{STS1}$ $RU_m$ field 824, further fields, a 3 bit PPET16 $N_{STSn}$ $RU_m$ field 825 and a 3 bit PPET8 $N_{STSn}$ $RU_m$ field 826.

Figure 9A:
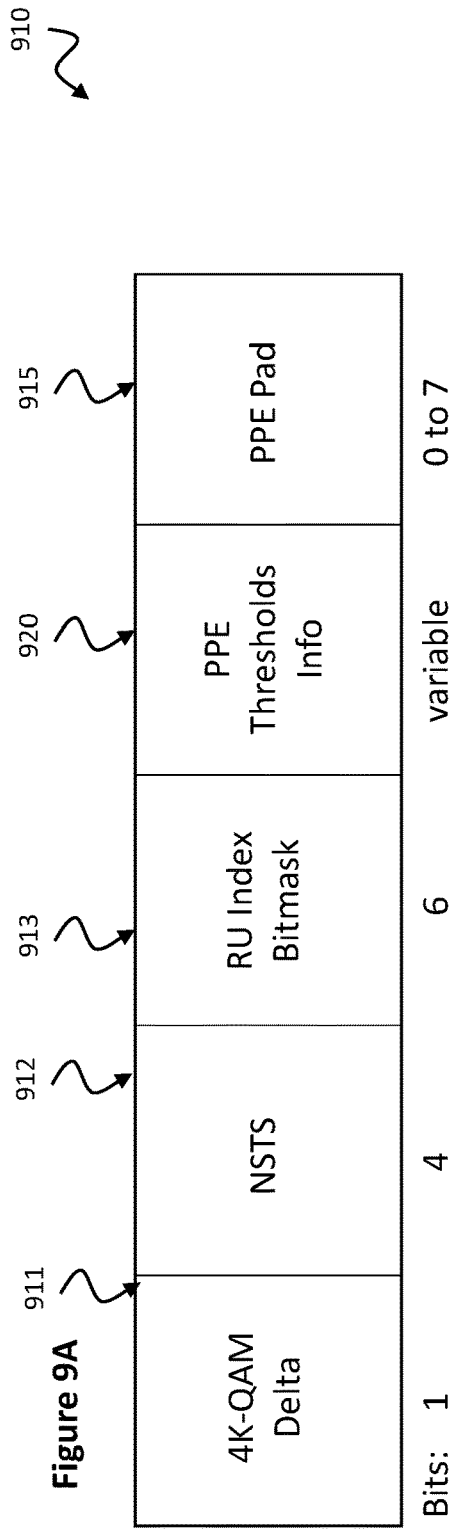
FIG. 9A shows a schematic diagram illustrating PPE Thresholds field format supporting 4K-QAM, additional RUs and more than 8 spatial streams according to the disclosure.

FIG. 9A shows the new PPE Thresholds field format 910 supporting 4K-QAM, additional NRUs and more than 8 spatial streams. The PPE Thresholds field format 910 includes a 1 bit 4K-QAM Delta field 911, a 4 bit $N_{STS}$ 912, a 6 bit RU Index Bitmask 913, a variable bit-size PPE Thresholds Info field 920 and a 0 to 7 bit PPE Pad field 915.

Figure 9B:
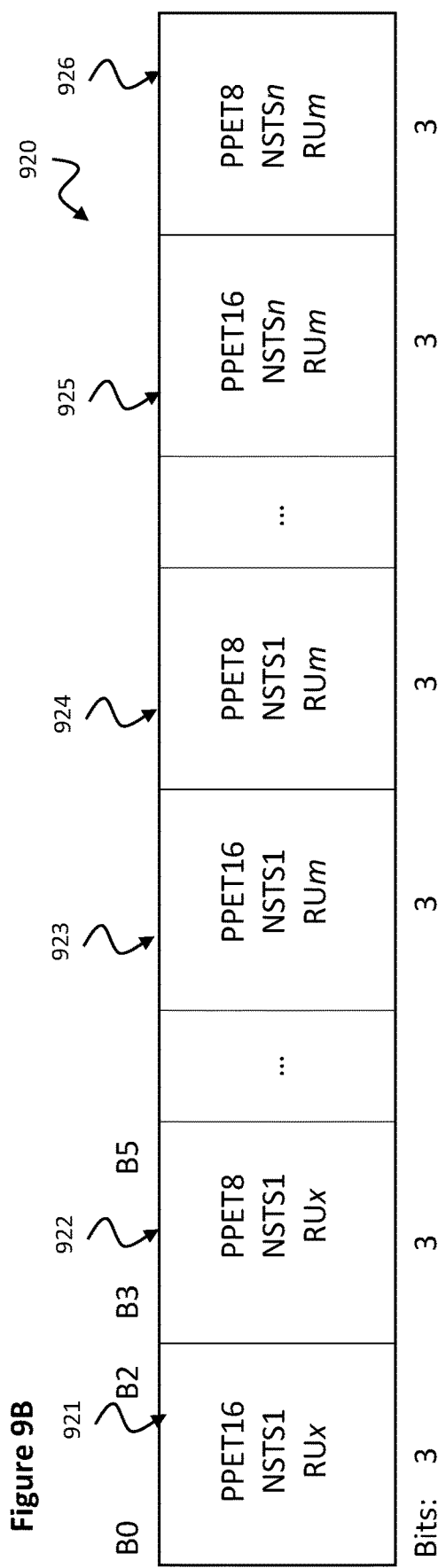
FIG. 9B shows a schematic diagram illustrating PPE Thresholds Info field format supporting 4K-QAM and additional RUs and more than 8 spatial streams according to the disclosure.

FIG. 9B shows the new PPE Thresholds Info field format 920 supporting 4K-QAM and additional RUs and more than 8 spatial streams. The PPE Thresholds Info field 920 includes a 3 bit PPET16 $N_{STS1}$ $RU_x$ field 921, a 3 bit PPET8 $N_{STS1}$ $RU_x$ field 922, further fields, a 3 bit PPET16 $N_{STS1}$ $RU_m$ field 923, a 3 bit PPET8 $N_{STS1}$ $RU_m$ field 924, further fields, a 3 bit PPET16 $N_{STSn}$ $RU_m$ field 925 and a 3 bit PPET8 $N_{STSn}$ $RU_m$ field 926.

In the following, introduction of pre&post-FEC and packet extension mechanisms is described with respect to FIGS. 5 to 9 to support IEEE 802.11be.

1. Support is added for new values of $N_{SD\_Short}$ that correspond to the size of the new multi-RU sizes.
   a. The following rows shown below (see Table 2) are added to the $N_{SD\_Short}$ table. These values are the linear combination of the respective, existing 802.11 ax RU values, since the requirements mentioned earlier are met.
   b. The equation (right side on Table 2) defines how the value of $N_{SD\_Short}$ is determined based on 802.11ax values, (for the 802.11ax defined RUs)

TABLE 2

$N_{SD\_Short}$ new values

| RU Size | $N_{SD\_Short}$ DCM = 0 | $N_{SD\_Short}$ DCM = 1 | Equation |
| --- | --- | --- | --- |
| 52 + 26 | 18 | 8 | RU52 + RU26 |
| 106 + 26 | 30 | 14 | RU106 + RU26 |
| 484 + 242 | 180 or 174 | 90 | RU484 + RU242 |
| 996 + 484 | 360 | 180 | RU996 + RU484 |
| 242 + 484 + 996 | 420 | 210 | RU242 + RU484 + RU996 |
| 484 + 2 × 996 | 600 or 606 or 612 | 300 or 306 | RU484 + 2 × RU996 |
| 3 × 996 | 720 or 726 or 738 | 360 or 366 | 3 × RU996 |
| 484 + 3 × 996 | 840 or 846 or 852 | 420 or 426 | RU484 + 3 × RU996 |
| 4 × 996 | 978 or 984 or 990 | 486 or 492 | 4 × RU996 |

2. For the case of 106+26, the following parameters with DCM=1, a single stream and MCS 0 apply:
   $N_{CBPS}$=51+12=63
   $N_{DBPS}$=25+6=31
   Hence, similar to 106 and 242-tone RUs, in 106+26 MRU: 63=2×31+1, so after every 2×NDBPS coded bits, a single padding bit (either 0 or 1) is added.

3. Addressing the accommodation of 4K-QAM, NSS>8 and 240/320 MHz in the PPE Threshold field in the following scenarios
   a. Full support within 11be (only within EHT capabilities, doesn't rely on HE capabilities).
      I. Change the PPE Thresholds field (including subfields) to accommodate 4K-QAM (see Table 3 below), 2×1992 tones RU size (see Table 4 below) and 16 streams (see FIG. 5), as shown below.
      II. Note: Multi-RU are not defined here, it is relied instead on larger RUs
      III. New values with respect to IEEE 802.11ax are Constellation index 6 with transmission constellation 4096-QAM in Table 3, RU allocation index 4 with RU allocation size 3×996 in Table 4, RU allocation index 5 with RU allocation size 4×996 in Table 5, $N_{STS}$ field 511 having a number of 4 bits and RU index bitmask 512 having a number of 6 bits in FIG. 5.

TABLE 3

Constellation Index

| Constellation Index | Corresponding Transmission Constellation |
| --- | --- |
| 0 | BPSK |
| 1 | QPSK |
| 2 | 16-QAM |
| 3 | 64-QAM |
| 4 | 256-QAM |
| 5 | 1024-QAM |
| 6 | 4096-QAM |
| 7 | None |

TABLE 4

RU Allocation Index

| RU Allocation Index | RU Allocation Size |
| --- | --- |
| 0 | 242 |
| 1 | 484 |
| 2 | 996 |
| 3 | 2 × 996 |
| 4 | 3 × 996 |
| 5 | 4 × 996 | b. For STAs that are compatible to HE i.e. supports up to 8 spatial streams, BW up to 160 MHz and modulation up to 1K-QAM: PPE Thresholds table from HE capabilities is sufficient.
   c. For STAs that are compatible to HE as in item b[0135] and in addition support 4K-QAM, two solutions can be applied, such that it is not required to transmit the 'full' capability in HE and EHT, but rather capability in HE and then only the additional capability ('delta') in EHT—this is true for all cases below (including items 'd', 'e' etc.):
      I. The capability field 610 will include an additional bit 611 as shown in FIG. 6A that
         i. Means, if set to '1', that all cases where combinations of $N_{SS}$ and $N_{RU}$ yield PPET8='1K-QAM' and PPET16='NONE', should be translated to PPET16='4K-QAM'
         ii. If this bit is set to '0', then PPET16 remains 'NONE' iii. New values 611 with respect to IEEE 802.11ax are shown in FIG. 6A.

II. The capability field 620 will include an additional bit 621 per combination of $N_{SS}$ and $N_{RU}$ as shown in FIG. 6B that iv. Means, if set to '1', that for each specific case, where combinations of $N_{SS}$ and $N_{RU}$ yield PPET8='1K-QAM' and PPET16='NONE', should be translated to PPET16='4K-QAM' v. If this bit 621 is set to '0', then PPET16 remains 'NONE' vi. Thus, a total of $N_{SS}*N_{RU}$ bits is added.

vii. New values 621 with respect to IEEE 802.11ax are shown in FIG. 6B.

III. As an alternative to items I and II above (or further option or embodiment), the capability fields 610 in FIG. 6A and 620 in FIG. 6B will not include the additional bits 611, 621. In this option, 4K-QAM can be indicated in EHT (802.11be) without any additional bit 611, 621. So, the only change is the additional value of 4096 in Table 3 shown above. This option is backward compatible with HE (802.11ax) because an HE device will consider the indication "6" as "NONE" anyway because it does not know 4K-QAM.

d. For STAs that are capable of supporting 4K-QAM and beyond 8 spatial streams the scheme shown in FIGS. 7A and 7B can be applied:

I. Transmit single 4K-QAM delta bit as before

II. For each combination of $N_{SS}$ and $N_{RU}$ that was not defined, need to define the PPET8/16 value III. Constellation index is modified identical to Table 3

IV. Thus, $1+(N_{SS}-8)*N_{RUs,11ax}*6$ bits are added

V. New values 711 with respect to IEEE 802.11ax are shown in FIG. 7A.

e. For STAs that are capable of supporting 4K-QAM and additional RUs (respective to 802.11 ax) the scheme shown in FIGS. 8A and 8B can be applied:

I. Transmit single 4K-QAM delta bit as before

II. For each combination of $N_{SS}$ and $N_{RU}$ that was not defined, need to define the PPET8/16 value III. Constellation index is modified identical to Table 3

IV. Thus, $1+N_{SS}*(N_{RUs,11be}-N_{RUs,11ax})*6$ bits are added

V. New values 811 with respect to IEEE 802.11ax are shown in FIG. 8A.

f. For STAs that are capable of supporting 4K-QAM, additional RUs (respective to 802.11ax) and beyond 8 spatial streams, the scheme shown in FIGS. 9A and 9B can be applied:

I. Transmit single 4K-QAM delta bit as before

II. For each combination of $N_{SS}$ and $N_{RU}$ that was not defined, need to define the PPET8/16 value III. Constellation index is modified identical to Table 3

IV. Thus, $1+[N_{SS}*(N_{RUs,11be}-N_{RUs,11ax})+(N_{SS}-8)*N_{RUs,11ax}]*6$ bits are added.

V. New values 911 with respect to IEEE 802.11ax are shown in FIG. 9A.

By using these changes, a communication device 100 can be provided as described above with respect to FIG. 1.

Such communication device 100 is configured to: transmit and/or receive a data frame based on a set of pre&post-Forward Error Correction, FEC, parameters and a set of packet extension, PE, parameters. The set of pre&post-FEC parameters is based on an extension of a set of pre&post-FEC parameters defined for a second radio transmission technology with respect to a size of resource units, RUs, supported by a first radio transmission technology, wherein the set of pre&post-FEC parameters is based on a combination of RUs that is supported by the first radio transmission technology. The set of PE parameters is based on an extension of a set of PE parameters defined for the second radio transmission technology with respect to a constellation size, a number of total space time streams and a resource unit, RU, allocation size supported by the first radio transmission technology.

The communication device 100 may be configured to: determine where a post-padding begins in the data frame based on the set of pre&post-FEC parameters, wherein the set of pre&post-FEC parameters is based on: an integer number of data subcarriers for a last symbol of the data frame, $N_{SD\_Short}$, as defined by an extended $N_{SD\_Short}$ table, wherein the extended $N_{SD\_Short}$ table is an extension of a $N_{SD\_Short}$ table defined by the second radio transmission technology with respect to additional values of $N_{SD\_Short}$ defined by the first radio transmission technology, an integer number of coded bits per symbol for the last symbol of the data frame, $N_{CBPS\_Short}$, wherein $N_{CBPS\_Short}$ depends on $N_{SD\_Short}$, and an integer number of data bits per symbol for the last symbol of the data frame, $N_{DBPS\_Short}$, wherein $N_{DBPS\_Short}$ depends on $N_{CBPS\_Short}$.

The pre&post-FEC parameters are also called "pre&post-FEC padding parameters" since these are the padding bits for the last symbol of a data frame. With pre&post-FEC padding, portions of ¼ of the last OFDM symbol (i.e. ¼, ½, ¾) are padded after encoding; these portions need not be decoded.

Different options apply for this set of pre&post-FEC parameters and this set of PE parameters as described in the following:

In a first option (Example #1), new rows are added to the $N_{SD\_Short}$ table as shown above in Table 2. These values are the linear combination of the respective, existing 802.11ax RU values, since the requirements mentioned earlier are met. The equation defines how the value of $N_{SD\_Short}$ is determined based on 802.11ax values (for the 11ax defined RUs).

The extended $N_{SD\_Short}$ table (see Table 2) may include one or more of the following combinations of RU values: 52+26, 106+26, 484+242, 996+484, 242+484+996, 484+2×996, 3×996, 484+3×996, 4×996.

A value of $N_{SD\_Short}$ for a combination of a first RU and a second RU that is supported by the first radio transmission technology may correspond to an addition of an $N_{SD\_Short}$ value for the first RU and an $N_{SD\_Short}$ value for the second RU, the first RU and the second RU being supported by the second radio transmission technology.

For example, possible combinations are the following: $N_{SD\_Short}$ for 484+242 is exactly $N_{SD\_Short}$ (242)+$N_{SD\_Short}$ (484); $N_{SD\_Short}$ for 52+26 is exactly $N_{SD\_Short}$ (52)+$N_{SD\_Short}$ (26): $N_{SD\_Short}$ for 106+26 is exactly $N_{SD\_Short}$ (106)+$N_{SD\_Short}$ (26); $N_{SD\_Short}$ for 996+484 is exactly $N_{SD\_Short}$ (996)+$N_{SD\_Short}$ (484): $N_{SD\_Short}$ for 242+484+996 is exactly $N_{SD\_Short}$ (242)+$N_{SD\_Short}$ (484)+$N_{SD\_Short}$ (996): $N_{SD\_Short}$ for 484+2×996 is exactly $N_{SD\_Short}$ (484)+$N_{SD\_Short}$ (996)+$N_{SD\_Short}$ (996); $N_{SD\_Short}$ for 3×996 is exactly $N_{SD\_Short}$ (996)+$N_{SD\_Short}$ (996)+$N_{SD\_Short}$ (996): $N_{SD\_Short}$ for 484+3×996 is exactly $N_{SD\_Short}$ (484)+$N_{SD\_Short}$ (996)+$N_{SD\_Short}$ (996)+$N_{SD\_Short}$ (996): $N_{SD\_Short}$ for 4×996 is exactly $N_{SD\_Short}$ (996)+$N_{SD\_Short}$ (996)+$N_{SD\_Short}$ (996)+$N_{SD\_Short}$ (996).

In a second option (Example #2), for the case of 106+26, there are the following parameters with DCM=1, a single stream and MCS 0:

$N_{CBPS}$=51+12=63
$N_{DBPS}$=25+6=31

Hence, similar to 106 and 242-tone RUs, in 106+26 MRU: 63=2×31+1, so after every 2×$N_{DBPS}$ coded bits, a single padding bit (either 0 or 1) is added.

The communication device 100 may be configured to add a single padding bit after every 2×$N_{DBPS}$ for the combination of RU values equal to 106+26, DCM switched-on, single stream and binary phase shift keying modulation with coderate ½.

The pre&post-FEC parameters are also called "pre&post-FEC padding parameters" since these are the padding bits for the last symbol of a data frame. With pre&post-FEC padding, portions of ¼ of the last OFDM symbol (i.e. ¼, ½, ¾) are padded after encoding; these portions need not be decoded.

In a third option (Example #3), the accommodation of 4K-QAM, $N_{SS}$>8 and 240/320 MHz is addressed in the PPE Threshold field, considering the following scenarios:

Full support within 11be (only within EHT capabilities, does not rely on HE capabilities)—described in Example #3a Relying on HE capabilities, then differentiation between different cases as shown in Table 5 can be performed:

TABLE 5 different Examples when relying on HE capabilities

| Case | Max RU Size | Max $N_{SS}$ | Max Modulation | Described in |
|---|---|---|---|---|
| 1 | >2 × 996 | ≥8 | ≥1K-QAM | Example #3b |
| 2 | ≥2 × 996 | ≥8 | 4K-QAM | Example #3c |
| 3 | >2 × 996 | >8 | 4K-QAM | Example #3d |
| 4 | >2 × 996 | ≥8 | 4K-QAM | Example #3e |
| 5 | >2 × 996 | >8 | 4K-QAM | Example #3f |

In the communication device 100, the extended set of PE parameters may be defined for at least one of an extended modulation scheme of 4K-QAM or higher, an extended number of spatial streams greater than 8 and an extended bandwidth of 240 MHZ, 320 MHz or higher.

The extended set of PE parameters may be based on an extension of a PHY packet extension, PPE, thresholds field defined for the second radio transmission technology, The PPE thresholds field may be extended by extending the NSTS subfield size to at least 4 bits and the RU index bitmask size to at least 6 bits.

NSTS is a subfield of PPE thresholds field that defines the maximum number of space time streams supported by a Station.

In case 0 of third option (Example #3a), full support within EHT is provided. The procedure corresponds to Table 3 and Table 4 shown above together with FIG. 5, i.e.: Change the PPE Thresholds field 510 (including sub-fields 511, 512, 520, 514) to accommodate 4K-QAM, 2×1992 tones RU size and 16 streams, as shown in Table 3 and Table 4. Note: Multi-RU are not defined here, it is relied instead on larger RUs.

In the communication device 100, the extended set of PE parameters may be based on an extension of a resource unit allocation index field defined for the second radio transmission technology. The extended resource unit allocation index field may comprise extended resource unit allocation sizes of 3×996 and/or 4×996 or higher.

The extended set of PE parameters may be based on an extension of a constellation index field defined for the second radio transmission technology. The extended constellation index field may comprise one or more extended constellations of 4096-QAM or higher.

In case 1 of third option (Example #3b), HE capabilities are re-used for STAs that support up to 8SS, 160 MHz BW and 1K-QAM. PPE Thresholds table from HE capabilities is hence sufficient.

In the communication device 100, the extended set of PE parameters may be based on reusing a PHY packet extension, PPE, thresholds field defined for the second radio transmission technology. The PPE thresholds field may be defined for modulation schemes less or equal than 1K-QAM, a number of spatial streams less or equal than 8 and resource unit sizes less or equal than 2×996.

In case 2 of third option (Example #3c), HE capabilities is sufficient to describe everything but 4K-QAM. The solution is to transmit a single bit 611 as shown in FIG. 6A, that means, if set to '1', that all cases where combinations of NSTS and RU_index yield PPET8='1K-QAM' and PPET16='NONE', should be translated to PPET16='4K-QAM'. If this bit is set to '0', then PPET16 remains 'NONE'. Thus, one bit is added.

In the communication device 100, the extended set of PE parameters may be based on reusing a PPE thresholds field defined for the second radio transmission technology and based on using a single bit 611 indicating the use of a modulation scheme of 4K-QAM.

In case 3 of third option (Example #3d), HE capabilities is sufficient to describe everything but 4K-QAM & beyond 8 streams. In this case as illustrated by FIGS. 7A and 7B, single 4K-QAM delta bit is transmitted as before (see case 2). For each combination of $N_{SS}$ and $N_{RU}$ that was not defined, need to define the PPET8/16 value. Constellation index is modified identically to Example #3a. Thus, 1+($N_{SS}$−8)*$N_{RUs,11ax}$*6 bits are added.

PPE threshold field format 810 is illustrated in FIGS. 7A and 7B. In one Example, following parameters apply: $N_{SS}$=12, RUs index bitmask 1110 (corresponding to supporting 20 MHz, 40 MHz & 80 MHz). In an Example, the following extension duration required for $N_{sts}$=9) apply: For RU=20: PPET16 is required when the modulation is 1KQAM and PPET8 is required in 64QAM. For RU=40: PPET16 is required when the modulation is 4KQAM and PPET8 is required in 64QAM. For RU=80: PPET16 is never required and PPET8 is required in 256QAM. In this example, Table 3 shown above applies in which the new line for constellation index 6 and transmission constellation 4096-QAM is added as shown in Table 3.

In the communication device 100, the extended set of PE parameters may be based on: using a single bit indicating the use of a modulation scheme of 4K-QAM, including a constellation of 4096-QAM in an extended constellation index field, and extending a PPE thresholds field defined for the second radio transmission technology by extending the NSTS subfield size to at least 4 bits in order to support up to 16 spatial streams.

In case 4 of third option (Example #3e), HE capabilities is sufficient to describe everything but 4K-QAM & additional RUs. In this case as illustrated by FIGS. 8A and 8B, single 4K-QAM delta bit 811 is transmitted as before. For each combination of $N_{SS}$ and $N_{RU}$ that was not defined, need to define the PPET8/16 value. Constellation index is modified identical to Example #3a. Thus, 1+$N_{SS}$*($N_{RUs,11be}$−$N_{RUs,11ax}$)*6 bits are added.

In one Example, as shown in FIGS. 8A and 8B, PPE threshold field 810 and PPE Thresholds Info field format 820 are as shown in FIGS. 8A and 8B. The following parameters apply: $N_{SS}$=4, RUs index bitmask 000110 (corresponding to supporting 160 MHZ & 240 MHZ). It also applies that Max $N_{sts}$=4.

In the communication device 100, the extended set of PE parameters may be based on: using a single bit indicating the use of a modulation scheme of 4K-QAM, including a constellation of 4096-QAM in an extended constellation index field, and extending a PPE thresholds field defined for the second radio transmission technology by extending the size of a resource unit index bitmask to at least 6 bits.

In case 5 of third option (Example #3f), HE capabilities is sufficient to describe everything but 4K-QAM, additional RUs and beyond 8 streams, so we need to account for all combinations. In this case as illustrated by FIGS. 8A and 8B, single 4K-QAM delta bit is transmitted as before. For each combination of $N_{SS}$ and $N_{RU}$ that was not defined, need to define the PPET8/16 value. Constellation index is modified identical to Example #3a. Thus, $1+[N_{SS}*(N_{RUs,11be}-N_{RUs,11ax})+(N_{SS}-8)*N_{RUs,11ax}]*6$ bits are added.

In the communication device 100 the extended set of PE parameters may be based on: using a single bit indicating the use of a modulation scheme of 4K-QAM, including a constellation of 4096-QAM in an extended constellation index field, and extending a PPE thresholds field defined for the second radio transmission technology by extending the NSTS subfield size to at least 4 bits and the RU index bitmask size to at least 6 bits.

Figure 10:
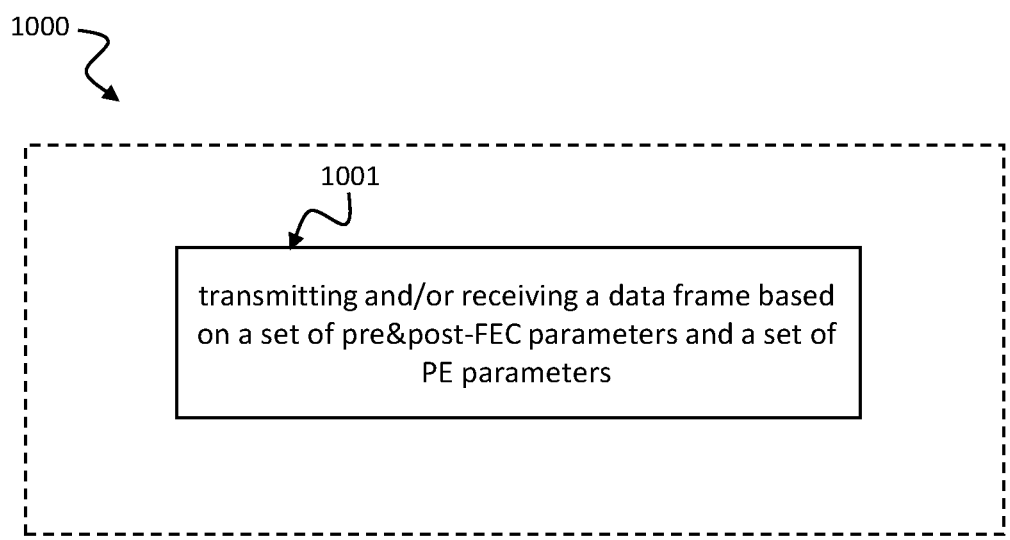
FIG. 10 shows a schematic diagram of a communication method 1000 according to the disclosure.

FIG. 10 shows a schematic diagram of a communication method 1000 according to the disclosure.

The communication method 1000 comprises transmitting and/or receiving 1001 a data frame based on a set of pre&post-Forward Error Correction, FEC, parameters and a set of packet extension, PE, parameters, e.g. as described above with respect to FIGS. 1 to 9. The set of pre&post-FEC parameters is based on an extension of a set of pre&post-FEC parameters defined for a second radio transmission technology with respect to a size of resource units, RUs, supported by a first radio transmission technology. The set of pre&post-FEC parameters is based on a combination of RUs that is supported by the first radio transmission technology and the set of PE parameters is based on an extension of a set of PE parameters defined for the second radio transmission technology with respect to a constellation size, a number of total space time streams and a resource unit, RU, allocation size supported by the first radio transmission technology.

The first and second radio transmission technologies can be WiFi technologies, the second radio transmission technology can be an existing WiFi technology, while the first radio technology can be a new WiFi technology, e.g. a new WiFi technology having higher bandwidth, multi-resource units and/or higher constellation scheme. For example, the first radio transmission technology can be IEEE 802.11be WiFi and the second radio transmission technology can be IEEE 802.11ax WiFi.

The first and second radio transmission technologies can be the same (with different settings) or different (with different capabilities).

A multiple RU as defined by the new first radio transmission technology is formed from a combination of two or more RUs defined by the old second radio transmission technology.

The present disclosure also supports a computer program product including computer executable code or computer executable instructions that, when executed, causes at least one computer to execute the performing and computing steps described herein, in particular the methods and procedures described above. Such a computer program product may include a readable non-transitory storage medium storing program code thereon for use by a computer. The program code may perform the processing and computing steps described herein, in particular the methods and procedures described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A communication device, comprising:
   a transceiver configured to transmit and/or receive a data frame based on a set of pre&post-Forward Error Correction (pre&post-FEC) parameters and a set of packet extension (PE) parameters;
   wherein the set of pre&post-FEC parameters is based on an extension of a set of pre&post-FEC parameters defined for a second radio transmission technology with respect to a size of resource units (RUS) supported by a first radio transmission technology, wherein the set of pre&post-FEC parameters is based on a combination of RUs that is supported by the first radio transmission technology;

wherein the set of PE parameters is based on an extension of a set of PE parameters defined for the second radio transmission technology with respect to a constellation size, a number of total space time streams, and a resource unit (RU) allocation size supported by the first radio transmission technology;

wherein the extension of the set of PE parameters is based on an extension of a constellation index field defined for the second radio transmission technology; and wherein the extension of the constellation index field comprises one or more extended constellations of 4096-QAM or higher.

2. The communication device of claim 1, further comprising:

a processor configured to determine where a post-padding begins in the data frame based on the set of pre&post-FEC parameters, wherein the set of pre&post-FEC parameters is based on:

an integer number of data subcarriers for a last symbol of the data frame ($N_{SD\_Short}$) as defined by an extended $N_{SD\_Short}$ table, wherein the extended $N_{SD\_Short}$ table is an extension of a $N_{SD\_Short}$ table defined by the second radio transmission technology with respect to additional values of $N_{SD\_Short}$ defined by the first radio transmission technology, an integer number of coded bits per symbol for the last symbol of the data frame ($N_{CBPS\_Short}$), wherein $N_{CBPS\_Short}$ depends on $N_{SD\_Short}$, and an integer number of data bits per symbol for the last symbol of the data frame ($N_{DBPS\_Short}$), wherein $N_{DBPS\_Short}$ depends on $N_{CBPS\_Short}$.

3. The communication device of claim 2, wherein the set of pre&post-FEC parameters is based on an extension of an $N_{SD\_Short}$ table defined for the second radio transmission technology with respect to combinations of RU values supported by the first radio transmission technology; and wherein the $N_{SD\_Short}$ table comprises predefined numbers of $N_{SD\_Short}$ values.

4. The communication device of claim 3, wherein the extended $N_{SD\_Short}$ table defines the numbers of $N_{SD\_Short}$ values for a dual-carrier modulation (DCM) switched on and/or a DCM switched off.

5. The communication device of claim 4, wherein:

for an RU size of 52+26 a value of $N_{SD\_Short}$ is 18 for DCM=0, and is 8 for DCM=1, for an RU size of 106+26 a value of $N_{SD\_Short}$ is 30 for DCM=0, and is 14 for DCM=1, for an RU size of 484+242 a value of $N_{SD\_Short}$ is 180 or 174 for DCM=0, and is 90 for DCM=1, for an RU size of 996+484 a value of $N_{SD\_Short}$ is 360 for DCM=0, and is 180 for DCM=1, for an RU size of 242+484+996 a value of $N_{SD\_Short}$ is 420 for DCM=0, and is 210 for DCM=1, for an RU size of 484+2×996 a value of $N_{SD\_Short}$ is 600 or 606 or 612 for DCM=0, and is 300 or 306 for DCM=1, for an RU size of 3×996 a value of $N_{SD\_Short}$ is 720 or 726 or 738 for DCM=0, and is 360 or 366 for DCM=1, for an RU size of 484+3×996 a value of $N_{SD\_Short}$ is 840 or 846 or 852 for DCM=0, and is 420 or 426 for DCM=1, for an RU size of 4×996 a value of $N_{SD\_Short}$ is 978 or 984 or 990 for DCM=0, and is 486 or 492 for DCM=1.

6. The communication device of claim 5, wherein the processor is further configured to:

add a single padding bit after every $2 \times N_{DBPS}$ for the combination of RU values equal to 106+26, DCM switched-on, single stream and binary phase shift keying modulation with code-rate ½.

7. The communication device of claim 1, wherein the extension of the set of PE parameters is defined for at least one of an extended modulation scheme of 4K-QAM or higher, an extended number of spatial streams greater than 8, or an extended bandwidth of 240 MHz or higher.

8. A method, comprising:

transmitting and/or receiving a data frame based on a set of pre&post-Forward Error Correction (pre&post-FEC) parameters and a set of packet extension (PE) parameters;

wherein the set of pre&post-FEC parameters is based on an extension of a set of pre&post-FEC parameters defined for a second radio transmission technology with respect to a size of resource units (RUs) supported by a first radio transmission technology, wherein the set of pre&post-FEC parameters is based on a combination of RUs that is supported by the first radio transmission technology;

wherein the set of PE parameters is based on an extension of a set of PE parameters defined for the second radio transmission technology with respect to a constellation size, a number of total space time streams, and a resource unit (RU) allocation size supported by the first radio transmission technology;

wherein the extension of the set of PE parameters is based on an extension of a constellation index field defined for the second radio transmission technology; and wherein the extension of the constellation index field comprises one or more extended constellations of 4096-QAM or higher.

9. The method of claim 8, further comprising:

determining where a post-padding begins in the data frame based on the set of pre&post-FEC parameters, wherein the set of pre&post-FEC parameters is based on:

an integer number of data subcarriers for a last symbol of the data frame ($N_{SD\_Short}$) as defined by an extended $N_{SD\_Short}$ table, wherein the extended $N_{SD\_Short}$ table is an extension of a $N_{SD\_Short}$ table defined by the second radio transmission technology with respect to additional values of $N_{SD\_Short}$ defined by the first radio transmission technology, an integer number of coded bits per symbol for the last symbol of the data frame ($N_{CBPS\_Short}$), wherein $N_{CBPS\_Short}$ depends on $N_{SD\_Short}$, and an integer number of data bits per symbol for the last symbol of the data frame ($N_{DBPS\_Short}$), wherein $N_{DBPS\_Short}$ depends on $N_{CBPS\_Short}$.

10. The method of claim 9, wherein the set of pre&post-FEC parameters is based on an extension of an $N_{SD\_Short}$ table defined for the second radio transmission technology with respect to combinations of RU values supported by the first radio transmission technology; and wherein the $N_{SD\_Short}$ table comprises predefined numbers of $N_{SD\_Short}$ values.

11. The method of claim 10, wherein the extended $N_{SD\_Short}$ table defines the numbers of $N_{SD\_Short}$ values for a dual-carrier modulation (DCM) switched on and/or a DCM switched off.

12. The method of claim 11, wherein:

for an RU size of 52+26 a value of $N_{SD\_Short}$ is 18 for DCM=0, and is 8 for DCM=1, for an RU size of 106+26 a value of $N_{SD\_Short}$ is 30 for DCM=0, and is 14 for DCM=1, for an RU size of 484+242 a value of $N_{SD\_Short}$ is 180 or 174 for DCM=0, and is 90 for DCM=1, for an RU size of 996+484 a value of $N_{SD\_Short}$ is 360 for DCM=0, and is 180 for DCM=1, for an RU size of 242+484+996 a value of $N_{SD\_Short}$ is 420 for DCM=0, and is 210 for DCM=1, for an RU size of 484+2×996 a value of $N_{SD\_Short}$ is 600 or 606 or 612 for DCM=0, and is 300 or 306 for DCM=1, for an RU size of 3×996 a value of $N_{SD\_Short}$ is 720 or 726 or 738 for DCM=0, and is 360 or 366 for DCM=1, for an RU size of 484+3×996 a value of $N_{SD\_Short}$ is 840 or 846 or 852 for DCM=0, and is 420 or 426 for DCM=1, for an RU size of 4×996 a value of $N_{SD\_Short}$ is 978 or 984 or 990 for DCM=0, and is 486 or 492 for DCM=1.

13. The method of claim 12, further comprising:

add a single padding bit after every $2 \times N_{DBPS}$ for the combination of RU values equal to 106+26, DCM switched-on, single stream and binary phase shift keying modulation with code-rate ½.

14. The method of claim 8, wherein the extension of the set of PE parameters is defined for at least one of an extended modulation scheme of 4K-QAM or higher, an extended number of spatial streams greater than 8, or an extended bandwidth of 240 MHz or higher.

\* \* \* \* \*

UNITED STATES PATENT AND TRADEMARK OFFICE
CERTIFICATE OF CORRECTION

PATENT NO. : 12,119,929 B2
APPLICATION NO. : 18/189878
DATED : October 15, 2024
INVENTOR(S) : Shilo et al.

It is certified that error appears in the above-identified patent and that said Letters Patent is hereby corrected as shown below:

On the Title Page

Item (57) Abstract: "units (RUS) supported by a first radio transmission technology," should read as -- units (RUs) supported by a first radio transmission technology, --.

Page 2: Item (56) References Cited, Other Publications, Left-Hand Column, NPL Citation #6: "IEE Draft, TGAX_CL-6" should read as -- IEEE Draft, TGAX_CL_26 --.

Page 2: Item (56) References Cited, Other Publications, Right-Hand Column, NPL Citation #13: "IEE Draft, TGAX_CL_6" should read as -- IEEE Draft, TGAX_CL_26 --.

In the Claims

Claim 1, Column 22, Line 63: "with respect to a size of resource units (RUS) supported" should read as -- with respect to a size of resource units (RUs) supported --.

Signed and Sealed this
Third Day of June, 2025

Coke Morgan Stewart
*Acting Director of the United States Patent and Trademark Office*